(12) United States Patent
Garcia Alsina et al.

(10) Patent No.: US 12,474,903 B1
(45) Date of Patent: Nov. 18, 2025

(54) SYSTEMS AND METHODS FOR AUTOMATICALLY GENERATING COMPUTER PROGRAMMING CODE AND SCHEDULES AND COMPARING THEIR PERFORMANCE

(71) Applicant: The MathWorks, Inc., Natick, MA (US)

(72) Inventors: Ivan Garcia Alsina, Framingham, MA (US); Partha Biswas, Wayland, MA (US); Jianyi Li, Framingham, MA (US)

(73) Assignee: The Math Works, Inc., Natick, MA (US)

( * ) Notice: Subject to any disclaimer, the term of this patent is extended or adjusted under 35 U.S.C. 154(b) by 118 days.

(21) Appl. No.: 18/386,178

(22) Filed: Nov. 1, 2023

Related U.S. Application Data

(60) Provisional application No. 63/506,988, filed on Jun. 8, 2023.

(51) Int. Cl.
*G06F 8/35* (2018.01)
*G06F 8/30* (2018.01)
(Continued)

(52) U.S. Cl.
CPC .................. *G06F 8/41* (2013.01); *G06F 8/10* (2013.01); *G06F 8/31* (2013.01); *G06F 8/315* (2013.01); *G06F 8/35* (2013.01); *G06F 8/36* (2013.01); *G06F 8/42* (2013.01); *G06F 8/443* (2013.01); *G06F 8/447* (2013.01); *G06F 8/451* (2013.01);
(Continued)

(58) Field of Classification Search
CPC ..... G06F 8/41; G06F 8/35; G06F 8/36; G06F 8/443; G06F 8/451; G06F 8/51; G06F 8/31; G06F 8/42; G06F 8/10; G06F 8/52; G06F 8/75; G06F 8/447; G06F 8/315; G06F 9/38873; G06F 9/4881; G06F 9/3005; G06F 9/45558; G06F 9/30174
See application file for complete search history.

(56) References Cited

U.S. PATENT DOCUMENTS 8,566,804 B1   10/2013   Carrick et al.
8,990,783 B1    3/2015   Yu et al.
(Continued)

OTHER PUBLICATIONS

Navdeep Katel et al., MLIR-Based Code Generation for GPU Tensor Cores, 2022, [Retrieved on Jul. 3, 2025]. Retrieved from the internet: <URL: https://dl.acm.org/doi/pdf/10.1145/3497776.3517770> 12 Pages (117-128) (Year: 2022).*

(Continued)

*Primary Examiner* — Anibal Rivera
(74) *Attorney, Agent, or Firm* — Cesari and McKenna, LLP

(57) ABSTRACT

Systems and methods utilize an auto-scheduler of a Domain Specific Language (DSL) to schedule one or more portions of a computer program written in a programming language other than the DSL. Portions of the computer program compatible with the DSL may be identified. The portions may be translated to a form compatible with the DSL. The DSL may generate schedules for the portions. Code may be generated for the computer program and the code may be executed. The schedules generated by the DSL may be utilized during execution of the code generated for the computer program.

12 Claims, 22 Drawing Sheets

(51) Int. Cl.

| | |
|---|---|
| *G06F 8/36* | (2018.01) |
| *G06F 8/41* | (2018.01) |
| *G06F 8/51* | (2018.01) |
| G06F 8/10 | (2018.01) |
| G06F 8/52 | (2018.01) |
| G06F 8/75 | (2018.01) |
| G06F 9/30 | (2018.01) |
| G06F 9/38 | (2018.01) |
| G06F 9/455 | (2018.01) |
| G06F 9/48 | (2006.01) |

(52) U.S. Cl.
CPC .................. *G06F 8/51* (2013.01); *G06F 8/52* (2013.01); *G06F 8/75* (2013.01); *G06F 9/3005* (2013.01); *G06F 9/30174* (2013.01); *G06F 9/38873* (2023.08); *G06F 9/45558* (2013.01); *G06F 9/4881* (2013.01)

(56) References Cited

U.S. PATENT DOCUMENTS

| | | | |
|---|---|---|---|
| 10,025,566 B1 | 7/2018 | Ahmed et al. | |
| 11,036,477 B2* | 6/2021 | Herr | G06F 9/5027 |
| 11,216,752 B1 | 1/2022 | Welsh et al. | |
| 11,269,639 B2* | 3/2022 | Herr | G06F 8/31 |
| 11,556,357 B1 | 1/2023 | Ghosh et al. | |
| 12,293,299 B1* | 5/2025 | Sharma | G06N 3/045 |
| 2021/0174214 A1* | 6/2021 | Venkatesan | G06N 3/08 |

OTHER PUBLICATIONS

Ziheng Wang, Automatic Optimization of Sparse Tensor Algebra Programs, 2020, [Retrieved on Jul. 3, 2025]. Retrieved from the internet: <URL: https://dspace.mit.edu/bitstream/handle/1721.1/127536/1193031233-MIT.pdf?sequence=1&isAllowed=y> 75 Pages (1-75) (Year: 2020).*

Adams, Andrew, et al., "Learning to Optimize Halide with Tree Search and Random Programs," ACM, ACM Transactions Graph, vol. 38, No. 4, Article 121, Jul. 2019, pp. 1-12.

Chen, Tianqi, et al., "TVM: An Automated End-to-End Optimizing Compiler for Deep Learning," ACM, Inc., ACM Digital Library, OSDI'18: Proceedings of the 13th USENIX conference on Operating Systems Design and Implementation, Oct. 8, 2018, pp. 579-594.

Ragan-Kelley, Jonathan, et al., "Decoupling Algorithms from Schedules for Easy Optimization of Image Processing Pipelines," ACM, ACM Journals, ACM Transactions on Graphics, vol. 31, Issue 4, Article No. 32, Jul. 1, 2012, pp. 1-12.

Ullah, Ubaid, et al., "Towards Optimal Placement and Scheduling of DNN Operations with Pesto," Association for Computing Machinery, ACM, In $22^{nd}$ International Middleware Conference (Middleware'21), Quebec City, QC, Canada, Dec. 5-11, 2021, pp. 1-13.

Wang, Ziheng, "Automatic Optimization of Sparse Tensor Algebra Programs," Massachusetts Institute of Technology, Submitted to the Department of Electrical Engineering and Computer Science in partial fulfillment of the requirements for the degree of Master of Science in Computer Science and Engineering, May 18, 2020, pp. 1-75.

Wu, Song-Lin, et al., "Accelerating OpenVX Through Halide and MLIR," Springer, Springer Science+Business Media, LLC, Singer Nature 2023, Journal of Signal Processing Systems, vol. 95, Feb. 1, 2023, pp. 571-584.

Zheng, Lianmin, et al., "Ansor: Generating High-Performance Tensor Programs for Deep Learning," arXiv, arXiv:2006.06762v4 [cs.LG], Nov. 4, 2020, pp. 1-19.

Zheng, Lianmin, et al., "Introducing TVM Auto-Scheduler (a.k.a. Ansor)," The Apache Software Foundation, TVM, Mar. 3, 2021, pp. 1-3.

Zheng, Lianmin, et al., "Optimizing Operators with Auto-Scheduling," The Apache Software Foundation, TVM, Retrieved from the Internet: < https://tvm.apache.org/docs/tutorial/auto_scheduler_matmul_x86.html>, Retrieved from the Internet on: Dec. 13, 2022, pp. 1-5.

Zheng, Size, et al., "FlexTensor: An Automatic Schedule Exploration and Optimization Framework for Tensor Computation on Heterogeneous System," ACM, ASPLOS'20, Session 10A, Lausanne, Switzerland, Mar. 16-20, 2020, pp. 859-873.

* cited by examiner

Halide Algorithm Code     ⌐1002

```
Buffer<double> InWeights1 {"InWeights1", 2} ;
  Buffer<double> In1 {"Inl", 2} ;
  Buffer<double> Out1 {"Out1", 2} ;

Var d1{ "d1" };―1010
Var d2{ "d2" };―1012
Func templ{"templ"}; ―1006 void generate() {
  RDom r(0, 3, 0, 3);
  templ1 (d1, d2) = sum(In1(d1+r.x-1, d2+r.y-1)
* Inweights1 (r.x, r.y));
  Out1 (d1, d2) = 3 * templ1(d1, d2) + 10;
}          \
            1008
```

Halide Schedule     ⌐1004

```
Out1
        .split (d2, d2, d2i, 14)        ⎫
        .split (d1, d2, d1i, 224)       ⎪
        .vectorize (d1i)                ⎬1016
        .reorder ({d1i, d1, d2i, d2})   ⎪
        .parallel (d2) ;                ⎭
templ1
        .split (d1, d1, d1i, 8)         ⎫
        .vectorize (d1i)                ⎪
        .compute_at (Out1, d1i)         ⎬1014
        .reorder({d1i, d1, d2});        ⎭
sum
        .split (d1, d1, d1i, 8)
        .vectorize (d1i)
        .compute_at (Out1, d1)
        .reorder({d1i, d1, d2});

sum.update(0)
        .split (d1, d1, d1i, 32)
        .vectorize (d1i)
        .reorder({r16_x, d1i, r16_y, d2, d1});
```

FIG. 10

Tiramisu Algorithm Code  ⌐1102

```
    buffer in_weights1("in_weights1", {3 ,
3} p_float64, a_input);
    buff in1("in1", {28, 28} p_float64,
a_input);
    buff out1("out1", {26, 26},
p_float64, a_output);
    var d1("d1"), d2("d2");     ⌐1106
    computation temp1 ("temp1", {d1, d2},
p_float64);

var r_x("r_x"), r_y("r_y");
    computation r("r", {r_x, r_y}, {0, 3});

templ.set_expression(sum(in1(d1 + r_x -
1, d2 + r_y - 1) * in_weights (r_x, r_y)));
                                ⌐1108
    computation output("output", {d1, d2},
3 * temp1 (d1, d2) +10);

output.store_in(&out1, {d1, d2});
```

Tiramisu Schedule  ⌐1104

```
Output
        .split (d1, d1, d1i, 128)
        .split (d2, d2, d2i, 24)          ⎫
        .reorder ({d2i, d1i, d1, d2})     ⎬ 1112
        .parallel (d2) ;                  ⎪
        .vectorize (d2i)                  ⎭
templ1
        .split (d1, d1, d1i, 16)          ⎫
        .store_at (out1, d1i)             ⎬ 1110
        .reorder({d1i, d1, d2});          ⎪
        .vectorize (d1i)                  ⎭
```

FIG. 11

| Scheduler | Avg Runtime (ms) | Max Runtime (ms) | Avg Memory (MB) | Max Memory (MB) | Avg L1 Cache Misses |
|---|---|---|---|---|---|
| MathWorks auto-scheduler | 100 | 250 | 200 | 400 | 10 |
| User provided | 20 | 1000 | 1000 | 5000 | 100 |
| Halide | 90 | 300 | 300 | 350 | 15 |
| Tiramisu | 70 | 200 | 400 | 600 | 13 |

[ Cancel ]  [ Help ]  [ Apply ]  [ Build ]

FIG. 12

```
int algorithmFcn(int A[1000][1000], F[1000][1000])
{
    int C[1000][1000], D[1000][1000], E[1000][1000];
    initArrays(A, B, C,); // Call externeal function to initialize
arrays // Region 1 code (1304') with DSL schedule to parallelize
outermost loop and vectorize innermost.
    #pragma omp parallel for shared(A,B,C) schedule (static)
    for (int i = 0; i < N; i++) { ─1404
        for (int j = 0; k < n; j++) {
            _m256i sum = mm256_setzero_si256() ; ─1406
            for (int k = 0; k < N; k += 8) {
                _m256i a = _mm256_load_si256((_m256i*) &A[i] [k]) ;
                _m256i b = _mm256_load_si256((_m256i*) &B[i] [j]) ;
                _m256i mul = _mm256_mullo_epi32 (a, b) ;
                sum = _mm256_add_epi32(sum, mul) ;
            }
            int* res = (int*) ∑
            C[i] [j] = res[1] + res[2] + res[3] + res[4] +
res[5] + res[6] + res[7] ;
        }
    } someExternalFunction (C, D) ;

// Region 2 code (1306') with DSL schedule to do 10 by 10 tiling
on outermost loops and vectorize innermost.
    for (int ii + 0; ii < img.size() ; ii += 10) { ─1410
        for (int jj = 0; jj < img.size() ; jj += 10) { ─1412
            for (int i = jj+1; j < min(jj+10 ,img.size() -1) ; j++) {
                _m128i minVal = _mm_set1_epi8 (255) ;
                for (int k = 0; k < 3; k++) {
                    for (int 1 = 0; 1 < 3; 1 += 16) {
                        _m128i imgVal =
_mm_loadu_si128((_m128i*)&D[i+k-1] [j+1-1] ) ;
                        minVal = _mm_min_epu8 (minVal, imgVal) ;
                    }
                }
                E[i] [j] = _mm_cvtsi128_s132 (minVal) ;
            }
        }
    } someOtherExternalFunction (E, F) ;
}
```

```
pipeline = [...                                              ~1500
@ (inputImage) convolution(inputImage, layer.Weight, layer.Bias), ... ~1504
@ (convOutput) max (convOutput, 0), ... % RELU               ~1504
@ (reluOut) neighborProcessorFun (@maxPooling, reluOut, true([2, 2]), ... ~1506
    'bottomright', 'constant', 0, 'same', [1 1]) ...
];                                                           ~1502
```

FIG. 16

```
schedule = coder.loop.Control (pipeline);                    ~1602
schedule (2) = schedule (0) .tile (1, 14, 2);
schedule (2) = schedule (0) .tile (1, 224, 3);              } ~1604
schedule (2) = schedule (0) .vectorize (3);
schedule (2) = schedule (0) .reorder (1, 2, 0, 3);
schedule (2) = schedule (0) .parallelize (1);

schedule (1) = schedule (1) .tile (0, 8, 2);
schedule (1) = schedule (1) .vectorize (2);
schedule (1) = schedule (1) .compute_at (2, 3) ; % Stage 2, index 3  } ~1606
schedule (1) = schedule (1) .reorder (1, 0, 2);

schedule (0) = schedule (2) .tile (0, 8, 2);
schedule (0) = schedule (2) .vectorize (2);
schedule (0) = schedule (2) .compute_at (2, 0) ; % Stage 2, index 0  } ~1608
schedule (0) = schedule (2) .reorder (1, 0, 2);

schedule (0) .update (0) = schedule (0) . update (0) .tile (0,32,4) ;
schedule (0) .update (0) = schedule (0) . update (0) .vectorize (4) ;  } ~1610
schedule (0) .update (0) = schedule (0) . update (0) .reorder (0,1,3,4,2) ;
schedule.apply () ;   ~1612
```

SYSTEMS AND METHODS FOR AUTOMATICALLY GENERATING COMPUTER PROGRAMMING CODE AND SCHEDULES AND COMPARING THEIR PERFORMANCE

CROSS-REFERENCE TO RELATED APPLICATIONS

This application claims the benefit of U.S. Provisional Patent Application Ser. No. 63/506,988, filed Jun. 8, 2023, by Ivan Garcia Alsina, Partha Biswas, and Jianyi Li, for Systems and Methods for Automatically Generating Computer Programming Code and Schedules and Comparing Their Performance, which application is hereby incorporated by reference in its entirety.

BRIEF DESCRIPTION OF THE DRAWINGS

The description below refers to the accompanying drawings, of which:

FIG. 10 is a highly schematic illustration of example DSL algorithm code and an example schedule created by a DSL in accordance with one or more embodiments;

FIG. 11 is a highly schematic illustration of example DSL algorithm code and an example schedule created by another DSL in accordance with one or more embodiments;

FIG. 12 is an illustration of an example report on the performance of evaluated DSLs, in accordance with one or more embodiments;

FIG. 14 is a schematic illustration of an example of generated code incorporating a DSL schedule in accordance with one or more embodiments;

FIG. 15 is a highly schematic illustration of an example of pseudocode for a program implementing an image processing pipeline according to one or more embodiments;

FIG. 16 is a highly schematic illustration of an example schedule generated for the pseudocode of FIG. 15 in accordance with one or more embodiments;

DETAILED DESCRIPTION OF ILLUSTRATIVE EMBODIMENTS

Figure 1:
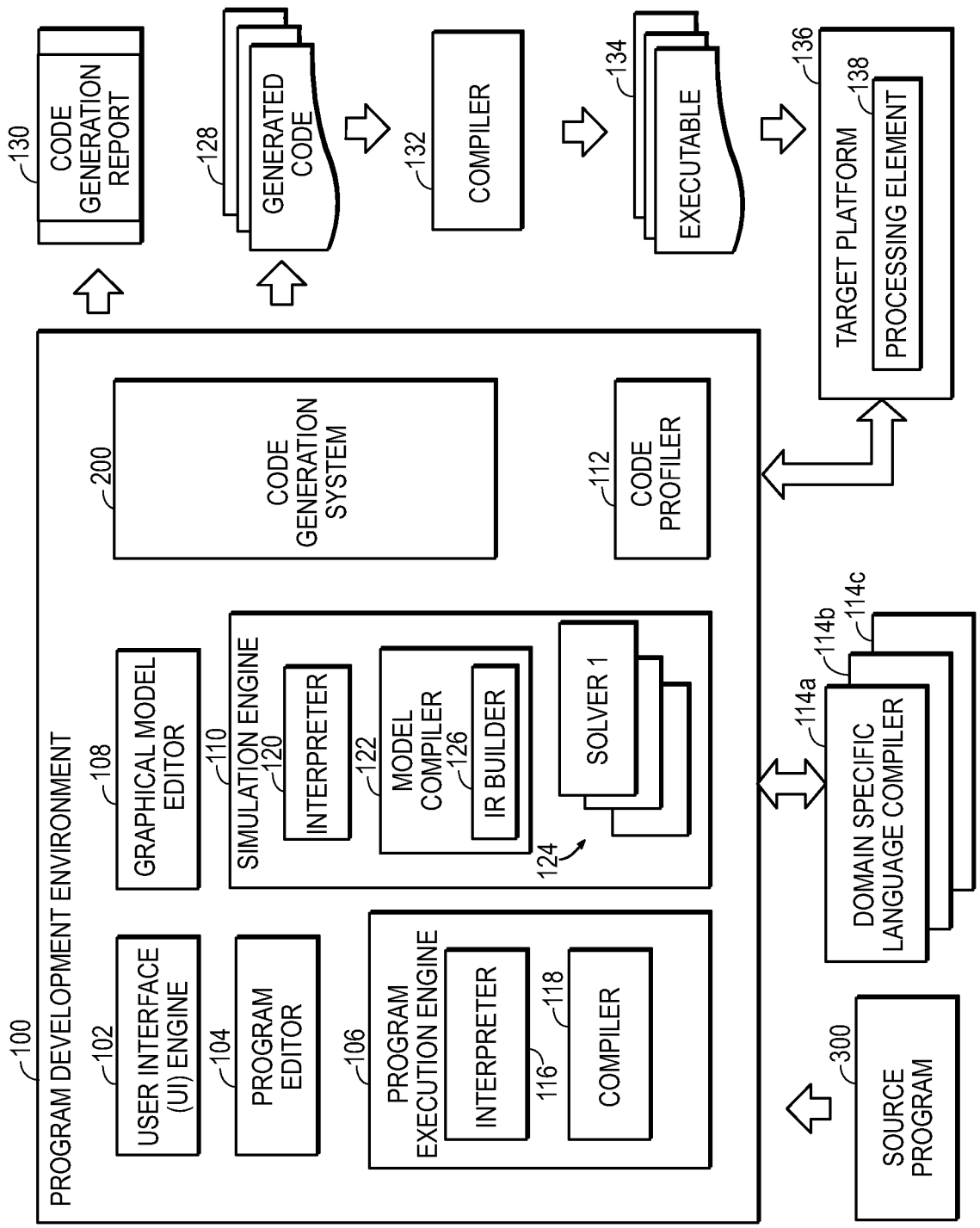
FIG. 1 is a schematic illustration of an example program development environment in accordance with one or more embodiments.

Image-processing and other high-throughput computer application programs often operate on tensors, which are multi-dimensional arrays of data. Deep-learning networks, for example, frequently include algebraic operations involving tensors contained in deeply-nested loops. These operations may be repeated tens of thousands of times. Tensor programs may be executed on different target platforms having different types of processing elements, such as Central Processing Units (CPUs), Graphical Processing Units (GPUs), and Tensor Processing Units (TPUs). The performance of tensor programs often depends on scheduling the tensor operations. A schedule implements particular choices for data locality, redundant computation, and parallelism on the particular CPU, GPU, or TPU of the target platform. In some cases, programmers manually design high-performance libraries with particular optimization options tailored to a target platform. The scheduling optimizations of such libraries are often intertwined with the mathematical calculations of the tensor operations. Manually creating such libraries, however, typically requires hardware programming experience and is a complex and time-consuming process. In addition, while manually written libraries may optimize individual nodes of a pipeline graph, they do not realize any optimizations between the nodes of a pipeline graph.

To ease the development of tensor applications, domain-specific languages (DSLs) have recently been created that allow the design of an algorithm—what the programmer wants to compute—to be separated from the design of the schedule—how the algorithm is computed. The specification of the computation and the schedule complete the program. By separating the algorithm from the schedule, a programmer using a DSL can change the schedule without impacting the computation. As a result, the programmer can evaluate different schedules, e.g., to find the one that results in faster execution of the program. While general-purpose languages (GPLs), such as Java and C++, can be used to create programs for use across a wide range of business, scientific, and engineering domains, DSLs—as their name implies—are specialized to a particular domain. A DSL is not typically used to create a program outside of the DSL's domain. Exemplary DSLs that separate the specification of the algorithm or compute from the specification of the schedule for the algorithm include Halide (for image processing), the Tensor Algebra Compiler (TACO) (for sparse linear and tensor algebra), Tiramisu (for linear and tensor algebra, deep learning, image processing, stencil computations and machine learning), and Apache TVM (for deep learning). Halide, TACO, Tiramisu, and Apache TVM are functional languages and are used to create programs that operate on tensors.

A schedule may be specified through the use of schedule primitives for the compute portion of the program. Different target platforms may support different schedule primitives. For example, for a Central Processing Unit (CPU), the 'parallel' primitive implements multithreading. For a Graphics Processing Unit (GPU), the 'bind' primitive assigns a loop to parallel blocks or threads. For a Tensor Processing Unit (TPU), the 'pipeline' primitive pipelines data read/write and computation and the 'latency hiding' primitive from TVM overlaps memory operations with computation to maximize memory utilization and compute resources. Exemplary schedule primitives that typically apply to all target platforms include 'split' (divides a loop into several sub-loops), 'reorder' (changes the execution order of loops), 'unroll' (unrolls a loop by a given depth), and 'inline' (inlines a function), among others. Creating a schedule involves choosing the right set of schedule primitives and assigning the proper parameters to those schedule primitives for efficient, e.g., fast, execution.

In some cases, such as with Halide and Apache TVM, the user may provide one or more schedule templates. A schedule template is a schedule without parameters. By assigning different parameters, a given schedule template may support hundreds or thousands of different schedules. A DSL may search through the schedule space defined by a schedule template and find the best parameters, e.g., that achieve fastest execution.

To further ease the creation of programs using DSLs, developers have created auto-schedulers for many DSLs. For example, the Halide DSL uses the auto-scheduler described in A. Adams et al. *Learning to Optimize Halide with Tree Search and Random Programs* ACM Trans. Graph., Vol. 38, No. 4 (July 2019). The Apache TVM DSL includes an auto-scheduler called Ansor. An auto-scheduler proposed for TACO is described in Z. Wang *Automatic Optimization of Sparse Tensor Algebra Programs* © May 2020 Massachusetts Institute of Technology.

The present disclosure relates to systems and methods that utilize the auto-scheduler created for a domain specific language (DSL) to schedule one or more portions of a computer program written in a programming language other than the DSL. By leveraging the DSL's auto-scheduler, the systems and methods can improve execution speed of the computer program on a target platform. The systems and methods may receive the computer program, the selection of one or more DSLs having auto-schedulers that are to be applied, and information identifying the target platform. The information regarding the target platform may indicate the type of processor, e.g., CPU, GPU, or TPU, and the processor's attributes and/or resources, such as number of cores, cache architecture, number of blocks and threads, etc. The systems and methods may partition the computer program such that the portions of the computer program that are within the domain of the DSL are in separate partitions from the portions of the program that are outside of the DSL's domain. For example, the DSL's domain may involve tensor computations, and the systems and methods may partition the program into portions including tensor computations and portions not including tensor computations. The systems and methods may identify the DSL-compatible partitions by searching for particular idioms and/or vectorized statements. The systems and methods may generate an Intermediate Representation (IR) of the program and may translate, e.g., lower, the portions of the IR corresponding to the partitions into a form that is compatible with the one or more selected DSLs. The systems and methods may then direct the one or more DSL auto-schedulers to generate schedules for the tensor partitions. The one or more DSL auto-schedulers may utilize the information describing the target platform to generate a schedule optimized for the target hardware. The systems and methods may incorporate each schedule generated by the one or more DSL auto-schedulers into another IR for the computer program.

In some embodiments, the systems and methods utilize the one or more DSLs to generate DSL code for the partitions including the generated schedule. The systems and methods may compile the generated DSL code into a library and enclose the library in a wrapper function. The systems and methods may replace the portions of the IR for which the libraries were generated with calls to the wrapper functions. The systems and methods may generate code from the IR where the generated code includes the calls to the wrapper functions. The generated code may be in the same programming language as the computer program or in another programming language. The generated code, including the calls to the wrapper functions containing the generated libraries, may be deployed to the target platform for execution. For example, the generated code may be compiled and deployed to the target platform. The generated code may be run on the target platform and the performance, e.g., execution speed, may be evaluated. The generated code with the fastest execution time may be retained, e.g., for deployment on production platforms.

In other embodiments, the systems and methods may utilize the schedule generated by the DSL auto-scheduler, but not generate or use DSL code when generating code for the source program. For example, the systems and methods may incorporate the schedule as determined by the DSL auto-scheduler directly into the generated code, instead of creating libraries and calls to wrapper functions. The systems and methods may apply the schedule generated by the DSL auto-scheduler by incorporating into the IR scheduling directives supported by the programming language of the generated code. In some embodiments, the systems and methods also may annotate the generated code to present, in a human-readable form, the scheduling choices made by the one or more DSL auto-schedulers. In other embodiments, the systems and methods may provide traceability from the generated code, including the schedules as determined by the one or more DSLs, back to the computer program.

In some embodiments, the user may revise the program to facilitate the creation of partitions. The systems and methods may then repeat the process using the revised to program to further improve execution speed.

FIG. 1 is a schematic illustration of an example program development environment 100 in accordance with one or more embodiments. The program development environment 100 may include a User Interface (UI) engine 102, a program editor 104, a program execution engine 106, a graphical model editor 108, a simulation engine 110, a code profiler 112, and a code generation system 200. The program development environment 100 also may include or have access to one or more Domain Specific Language (DSL) compilers 114*a-c*.

The UI engine 102 may create and present one or more User Interfaces (UIs), such as Graphical User Interfaces (GUIs) and/or Command Line Interfaces (CLIs), on a display of a workstation or other data processing device. The UIs may be operated by a user to initiate various program development-related tasks. For example, a user may open, write, edit, and save a source program, such as source program 300. These tasks may be performed by the program editor 104 in response to user inputs. The UIs also may be operated to open, construct, edit, and save source programs in the form of graphical models, such as executable block diagrams, and the graphical model editor 108 may perform the selected operations in response to user inputs. The program execution engine 106 and/or the simulation engine 110 may be used to run and/or execute the source program 300.

The source program 300 may be in source code format, and may have been manually created, e.g., written, by one or more users, such as programmers or developers or automatically generated for example from a graphical model. In some embodiments, the source program 300 may be written in conformance with the semantics and syntax of a programming language providing a higher level of abstraction than the C/C++ languages, such as the MATLAB program development environment, the Octave programming languages, the Julia programming language, the Python programming language, the LabVIEW graphical programming language, etc. The source program 300 may not include any code corresponding to the one or more DSL compilers 112*a-c*.

The program execution engine 106 may include an interpreter 116 and/or a compiler 118. In some embodiments, the compiler 118 may be a just-in-time (JIT) compiler that converts the source program 300 from source code into machine-executable code or virtual-machine executable code.

The simulation engine 110 may include an interpreter 120, a model compiler 122, and one or more solvers, designated at 124. The model compiler 122 may include one or more Intermediate Representation (IR) builders, such as IR builder 126. The simulation engine 110 may execute, e.g., compile and run or interpret a source program that is in the form of a graphical model using one or more of the solvers 124. Exemplary solvers include one or more fixed-step continuous solvers, which may utilize integration techniques based on Euler's Method or Heun's Method, and one or more variable-step solvers, which may be based on the Runge-Kutta and Dormand-Prince pair.

As described herein, the code generation system 200 may generate code, such as code 128, for the source program 300 or portion thereof automatically. The code generation system 200 also may generate a code generation report 130. The generated code 128 may conform to the same programming language as the source program 300 or to another programming language, such as a C/C++ for example. The generated code 128 may be provided to a compiler 132, which may translate the generated code 128 into executable code 134. The executable code 134 may be deployed to a target platform 136 having one or more processing elements 138 for execution.

The code profiler 112 may measure execution characteristics, such as execution time, of the executable 134 running on the target platform 136. The execution characteristics may be logged or stored by the code profiler 112.

Suitable program development environments include the MATLAB® program development system and the Simulink® model-based design system both from The Math Works, Inc. of Natick, MA, the TargetLink code generation system from dSpace GmbH of Paderborn Germany, the LabVIEW programming system from National Instruments Corp. of Austin, TX, the MatrixX modeling environment from National Instruments Corp., the Visual Engineering Environment (VEE) from Agilent Technologies, Inc. of Santa Clara, CA, a Unified Modeling Language (UML) system, a Systems Modeling Language (SysML) system, the Eclipse IDE for programming in Java from the Eclipse Foundation, the Anaconda distribution for programming in Python or the R programming languages from Anaconda, Inc., the Colaboratory tool for Python programming from Google, a C or C++ programming system, a Python programming system, and the JuliaPro computing system, among others. The MATLAB® and Simulink® environments provide a number of high-level features that facilitate algorithm development and exploration, and support model-based design. The Simulink® model-based design environment is a block diagram-based design environment for modeling and simulating dynamic systems, among other uses. The Simulink® model-based design environment together with the MATLAB algorithm development environment provide a number of high-level features that facilitate algorithm development and exploration, and support model-based design, including dynamic typing, array-based operations, data type inferencing, sample time inferencing, and execution order inferencing, among others.

The source program 300 may be a textual program, a graphical program, such as a graphical model, or a combination textual/graphical program. As noted, exemplary text-based source programs include MATLAB programs, Java programs, Mathematica programs, Python programs, Julia programs, ADA programs, Octave programs, and MathScript programs, among others. Exemplary graphical models include Simulink models, Stateflow charts, LabVIEW block diagrams, MatrixX models, Scade models, and Agilent VEE diagrams, among others. Other forms of the source program 300 include Modelica models from the Modelica Association, Uniform Modeling Language (UML) models, and Systems Modeling Language (SysML) models, among others.

Exemplary target platforms 136 and/or processing elements 138 include the Raspberry Pi single board computer available from the Raspberry Pi Foundation, the Hexagon series of Digital Signal Processors (DSPs) from Qualcomm Technologies, Inc., smartphones and tablets running the Android Operating System (OD), such as the Galaxy line of smartphones and tablets from Samsung Group of South Korea and the Pixel series of smartphones from Google LLC of Mountain View, CA, among others.

Figure 2:
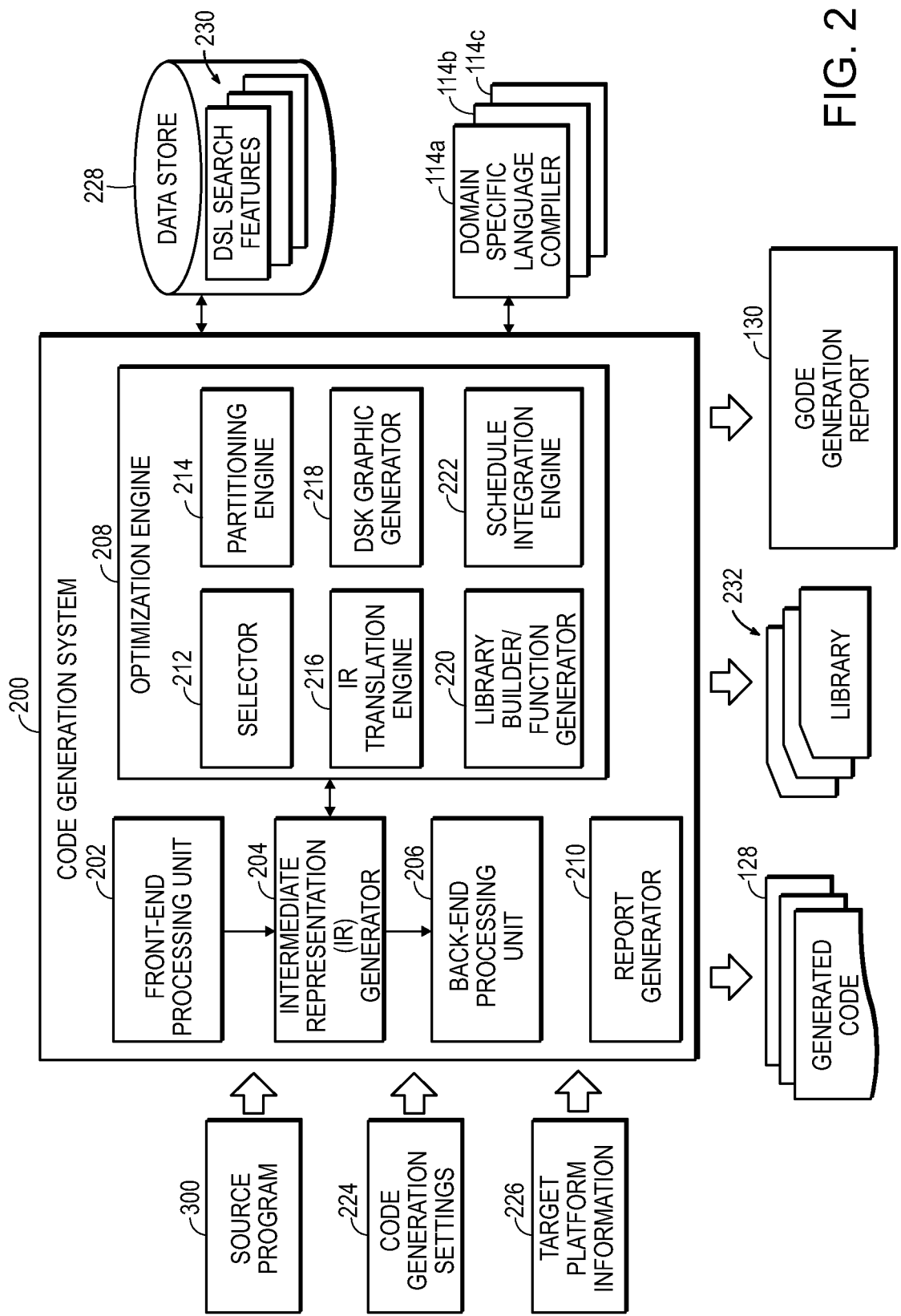
FIG. 2 is a schematic illustration of an example of the code generation system in accordance with one or more embodiments.

FIG. 2 is a schematic illustration of an example of the code generation system 200 in accordance with one or more embodiments. The code generation system 200 may include a front-end processing unit 202, an intermediate representation (IR) generator 204, a back-end processing unit 206, an optimization engine 208, and a report generator 210. The optimization engine 208 may include a selector 212, a partitioning engine 214, an IR translation engine 216, a DSL graphic generator 218, a library builder (function generator) 220, and a schedule integration engine 222. In some embodiments, the IR generator 204 may be included in the front-end processing unit 202. In other embodiments, the code generation system 200 may utilize the IR builder 126 of the model compiler 122, rather than or in addition to having its own IR generator 204.

The code generation system 200 may access the source program 300. The code generation system 200 also may access or receive one or more code generation settings indicated at 224 and information 226 regarding the target platform 136. The code generation system 200 also may access and/or interact with the one or more DSL compilers 114*a-c*. The code generation system 200 may access a data store 228 that may contain one or more sets of DSL search features indicated at 230. The code generation system 200 may generate the code 128 for the source program 300, which may be optimized for the target platform 136, e.g., for the one or more processing elements 138 of the target platform 136. In some embodiments, the code generation system 200 also may generate one or more libraries indicated at 232. The one or more libraries 232 may be accessed by and/or included in the generated code 128. In addition, the report generator 210 may produce the code generation report 130.

The code generation system 200 and/or one or more of its components may be implemented through one or more software modules or libraries containing program instructions that perform the methods described herein, among other methods. The software modules may be stored in one or more memories, such as a main memory, a persistent memory, and/or a computer readable media, of a data processing device, and may be executed by one or more processors. Other computer readable media may also be used to store and execute these program instructions, such as one or more non-transitory computer readable media, including optical, magnetic, or magneto-optical media. In other embodiments, the code generation system 200 or portions thereof may be implemented in hardware, for example through hardware registers and combinational logic configured and arranged to produce sequential logic circuits that implement the methods described herein. In other embodiments, various combinations of software and hardware, including firmware, may be utilized to implement the systems and methods of the present disclosure.

The source program 300, the code generation settings 224, the target platform information 226, the generated code 128, the code generation report 130, the one or more libraries 232, and the executable 130 may be stored in one or more computer memories as one or more data structures, such as files, objects, linked lists, etc. The code generation report 228 also may be presented on an output device, such as a display or a printer.

Exemplary code generators include the HDL Coder, the Simulink Coder, the Embedded Coder, and the Simulink PLC Coder products from The Math Works, Inc., and the TargetLink coded generation system from dSpace GmbH.

FIGS. 1 and 2 are intended for illustrative purposes and the present disclosure may be used with other program development environments and/or code generation systems, e.g., having additional, fewer, or other components. For example, in some embodiments, the code generator system 200 may be a separate application or module relative to the program development environment 100.

Figure 3:
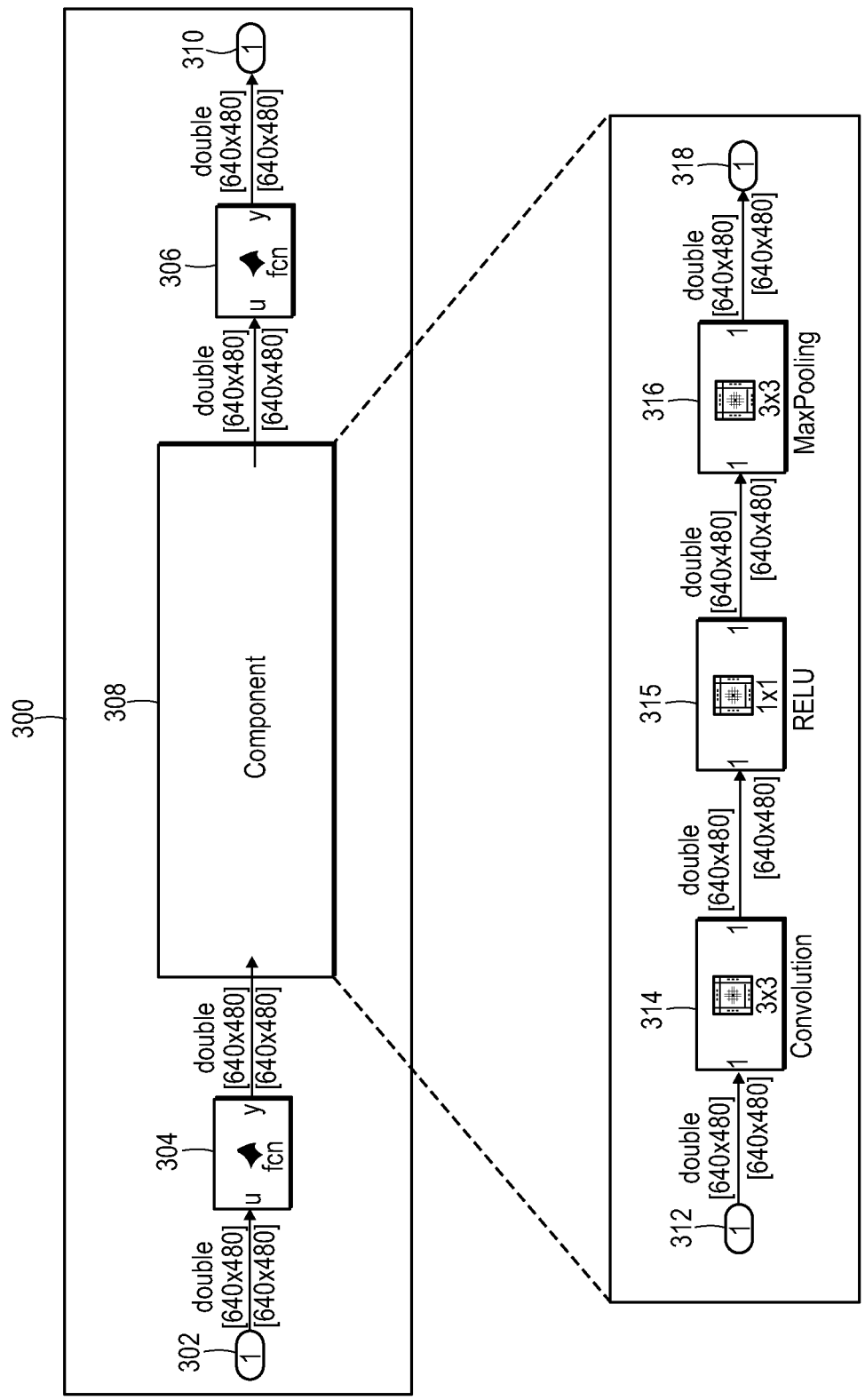
FIG. 3 is a schematic illustration of an example of the source program in accordance with one or more embodiments.

FIG. 3 is a schematic illustration of an example of the source program 300 in accordance with one or more embodiments. The source program 300 may include an input port 302, such as an Inport block, two code blocks 304 and 306, such as MATLAB function blocks, a component 308, such as a Subsystem block, and an output port 310, such as an Outport block. As also illustrated in FIG. 3, the component 308 may include an input port 312, such as an Inport block, three components 314-316, such as Neighborhood Processing subsystems, and an output port 318, such as an Outport block. The Neighborhood Processing subsystem 314 may be configured to perform a convolution operation. The Neighborhood Processing subsystem 315 may be configured to perform a ReLU operation. The Neighborhood Processing subsystem 316 may be configured to perform a max pooling operation.

FIGS. 4A-F are partial views of a flow diagram of an example method in accordance with one or more embodiments. The flow diagram of FIGS. 4A-F is meant for illustrative purposes only. For example, in some embodiments, one or more steps may be omitted, additional steps may be added, the order of steps may be changed, and/or one or more sequences indicated by the arrows may be altered or omitted. The code generation system 200 may access or receive a source program, such as the source program 300, or a portion thereof for which code is to be automatically generated, e.g., the generated code 128, as indicated at step 402. The code generation system 200 may receive a selection of one or more schedulers, such as the autoschedulers of one or more of the DSL compilers 114, that are to be applied to the source program 300, as indicated at step 404. At least one of the one or more schedulers may be associated with different programming languages than the programming language used to create the source program 300. In some embodiments, the selection of schedulers, e.g., DSL compilers, may be specified through a user interface created by the UI engine 202.

Figure 5:
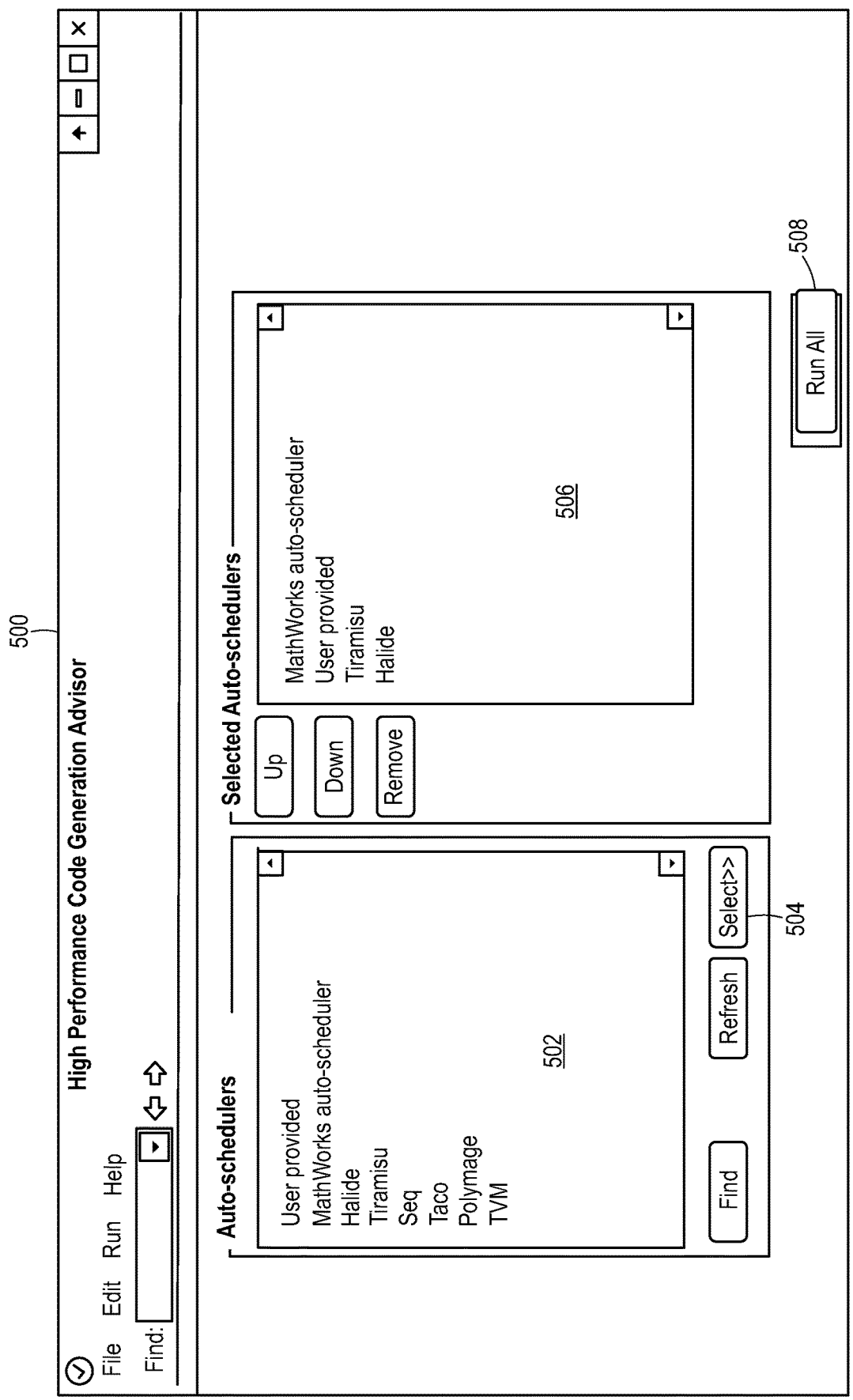
FIG. 5 is a schematic illustration of an example User Interface (UI) through which a user can select one or more Domain Specific Languages (DSLs) to be utilized during the code generation process in accordance with one or more embodiments.

FIG. 5 is a schematic illustration of an example User Interface (UI) 500 through which a user can select one or more schedulers, e.g., DSL compilers, to be utilized during the code generation process in accordance with one or more embodiments. The UI 500 may be created by the UI engine 102 and may be presented on a display, e.g., of a data processing device. The UI 500 may be in the form of a popup window. The UI 500 may include an area 502 listing all of the DSLs and/or DSL compilers available to the code generation system 200. The UI 500 may include a Select command button 504 that may be used to select one or more of the DSLs and/or DSL compilers listed in the area 502. As the one more DSLs and/or DSL compilers are selected, they may be presented in an area 506. The UI 500 also may include a Run All command button 508 for applying the selected DSLs to the source program 300.

Returning to FIG. 4A, the code generation system 200 may receive the information 226 on the target platform 136 that is to run the generated code 128, as indicated at step 406. The information 226 may describe the number and type of processing elements 138 on the target platform 136. For example, the information 226 may indicate whether the target platform includes a CPU, GPU, TPU, the number of CPU cores, GPU processors, Matrix Units (MXUs), the cache and/or buffer sizes and architectures, etc. In some embodiments, the information may identify the target platform 136 by product name or product family. The code generation system 200 may include or have access to a database that describes the processing elements and cache architectures included in target platforms and may perform a lookup with the received information 226.

The code generation system 200 also may receive one or more options, such as the code generation settings 220, for guiding or controlling the code generation process for the source program 300, as indicated at step 408.

Figure 6:
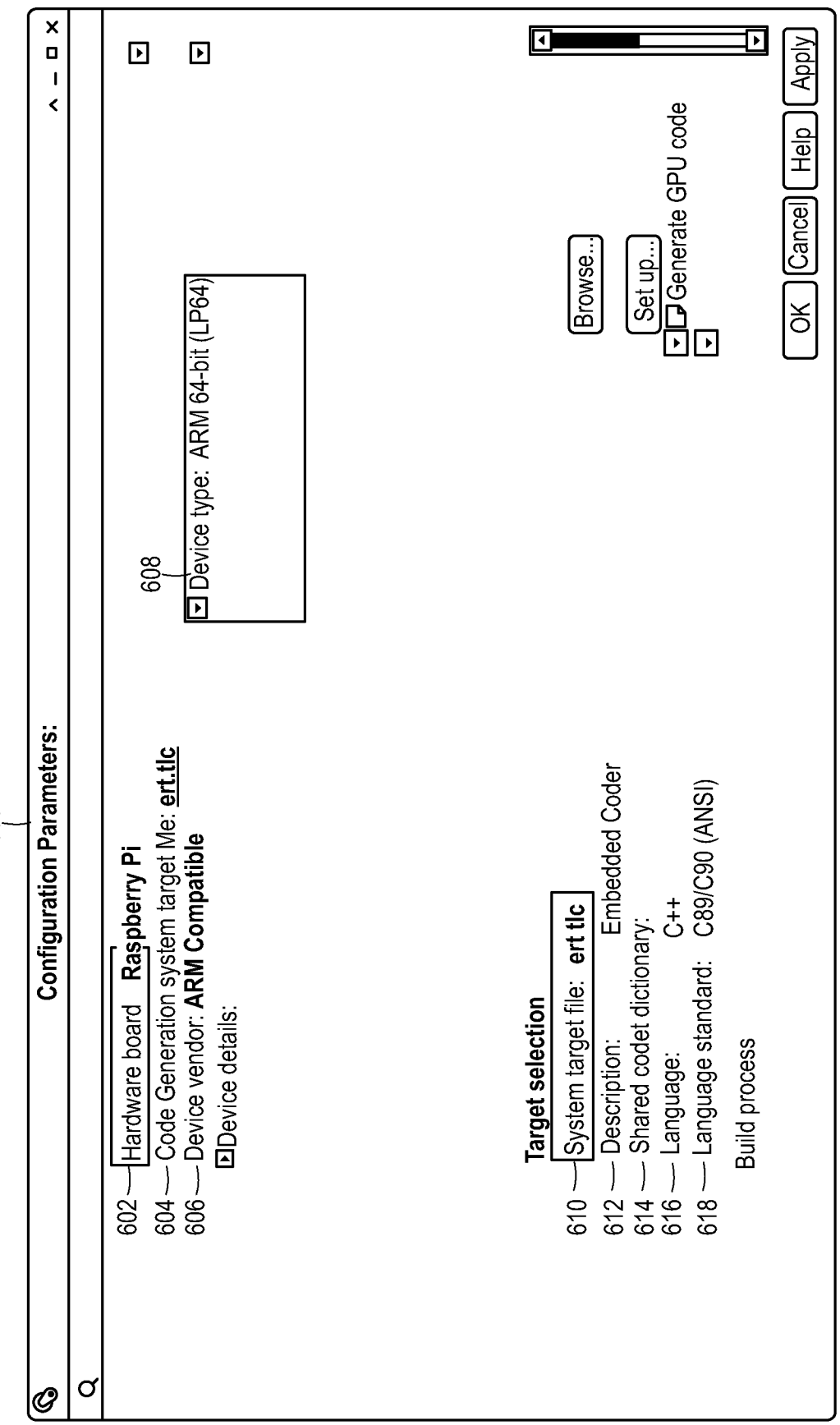
FIG. 6 is schematic illustration of an example User Interface (UI) through which a user can choose options for the code generation process in accordance with one or more embodiments.

FIG. 6 is a schematic illustration of an example User Interface (UI) 600 through which a user can specify the one or more code generation settings 224 for the code generation process in accordance with one or more embodiments. The UI 600 may include a dropdown element 602 named 'Hardware board' through which a user may specify the hardware board on which the system represented by the model 300 is to be implemented. Exemplary hardware boards include Raspberry Pi, host computer, and Android Device. As illustrated, the Raspberry Pi hardware board may be selected. The UI 600 may include a display element 604 named 'Code Generation system target file' that presents the target file selected by the user. The UI 600 includes a dropdown element 606 named 'Device vendor' and a dropdown element 608 named 'Device type', which may be automatically set by the code generation system 200 based on the selected hardware board at element 602. The elements 606 and 608 present the manufacturer of the hardware board and the type of hardware, e.g., processor element, respectively.

The UI 600 also may include a data entry element 610 named 'System target file' in which the user may identify the file that will be used to control the code generation stage of the build process. The file name entered at element 610 is presented at display element 604. The UI 600 also may include a display element 612 named 'Description' that identifies the code generation tool, such as the Embedded Coder tool from The MathWorks, Inc. The UI 600 may include a data entry element 614 named 'Shared coder dictionary' in which the user may identify a dictionary of the code generation tool that contains code interface configuration for code generation. The UI 600 may include a dropdown element 616 named 'Language' through which the user may select the computer programming language of the code being generated, e.g., C, C++, CUDA, OpenCL, Mojo (from Modular Inc.), MLIR, LLVM assembly code, etc. The UI 600 also includes a dropdown element 618 named 'Language standard' through which the user may select a language standard, such as C++03 or C++11 (ISO) for the C++ programming language and C99 (ISO) for the C programming language.

It should be understood that other settings or options may also be specified and received by the code generation system 200.

As noted, the code generation system 200 may be configured to support one or more hardware boards, such as host computer, e.g., workstation or laptop having an Intel x86 series CPU, Raspberry Pi, smartphone and tablet devices running the Android Operating System (OS) or other commercially available hardware boards. A user may also configure the code generation system 200 to support a hardware board. For example, the program development environment 100 may include one or more predefined functions that can be run by a user to add a new supported hardware board to the code generation system 200. The one or more predefined functions may take as arguments a name of the new target hardware board, the operating system run by the board, the processor architecture, the processor bit size, the number of cores of the processor, and the number of threads per core, among other information. After running the one or more predefined functions, the new target hardware board may be available for selection, e.g., at the dropdown element 602.

Figure 4A:
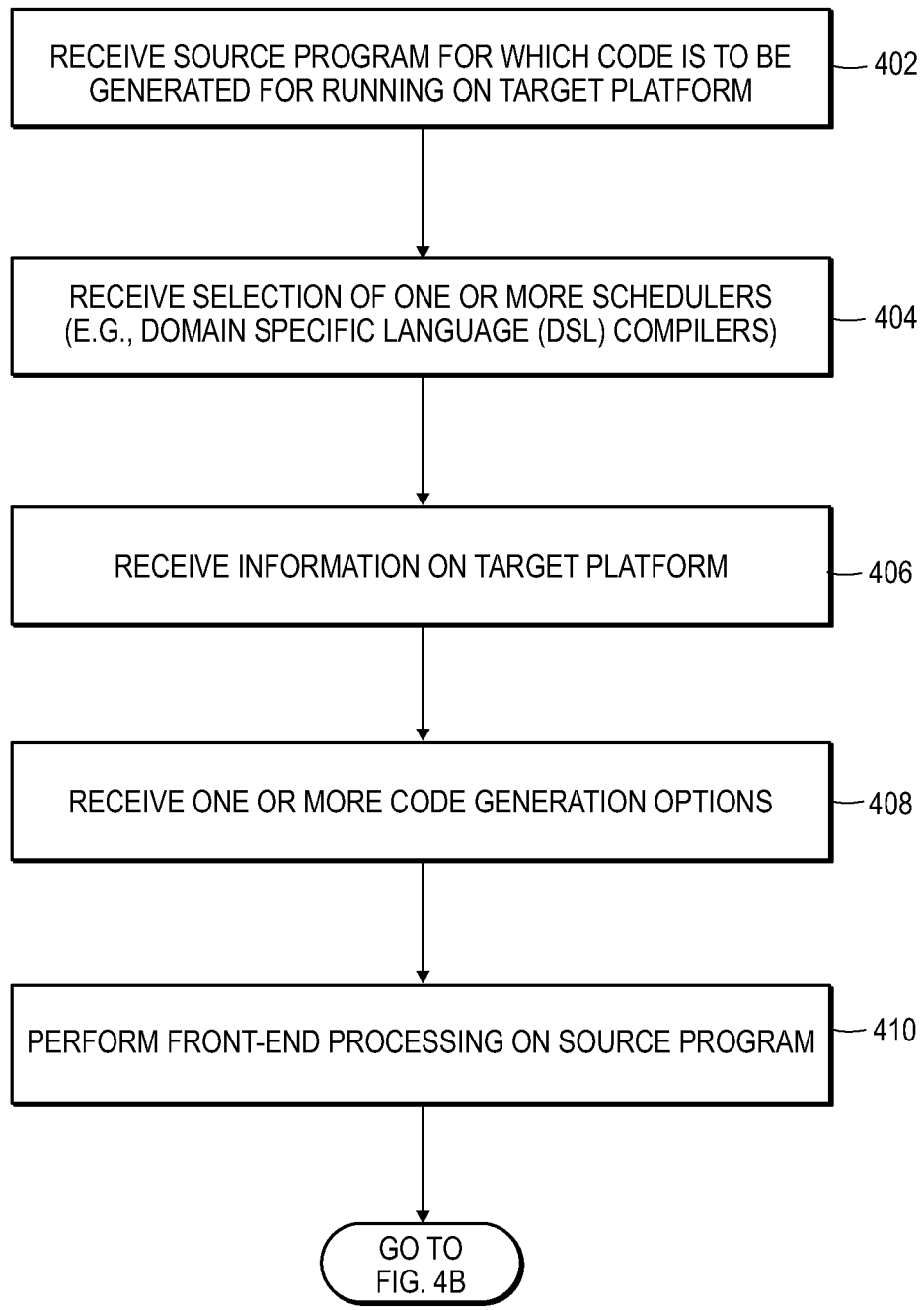
FIGS. 4A-F are partial views of a flow diagram of an example method in accordance with one or more embodiments.
Figure 4B:
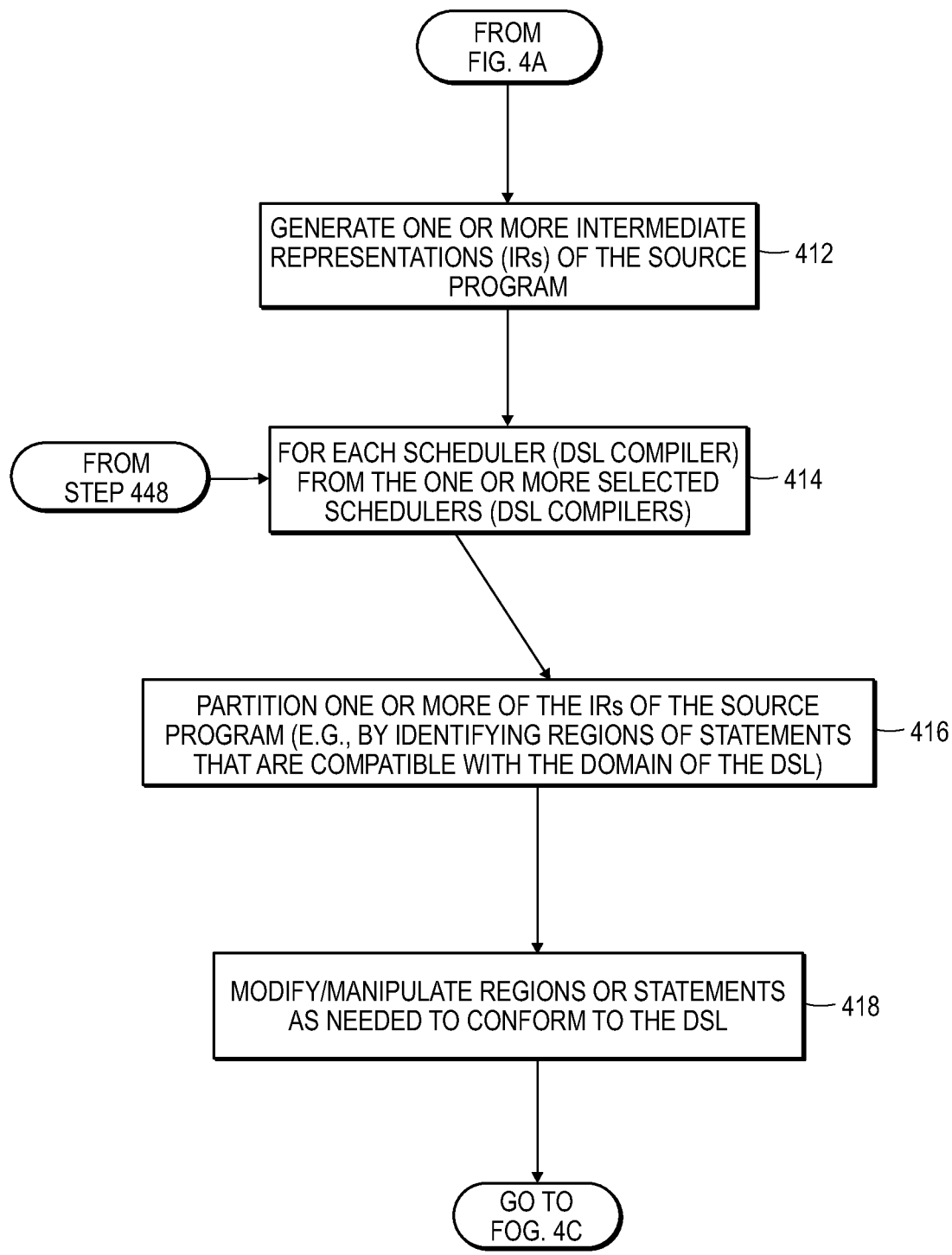

Again, returning to FIG. 4A, the front-end processing unit 202 may perform one or more preliminary tasks on the source program 300, as indicated at step 410. For example, the front-end processing unit 202 may perform type checking and lexical analysis of the source program 300, among other preliminary tasks. The IR generator 204 may create one or more intermediate representations (IRs) of the source program 300, as indicated at step 412 (FIG. 4B). One or more of the IRs constructed by the IR generator 204 may be in a form that is source and target language independent, such that operations and data contained within the IR is not specific to the programming language in which the source program 300 was written. The front-end processing unit 202 and/or the IR generator 204 may be configured to translate source programs conforming to a variety of different programming languages, such as MATLAB, Python, Octave, Julia, Java, Simulink models, LabVIEW virtual instruments, etc., to the one or more IRs. That is, the front-end processing unit 202 and/or the IR generator 204 may be capable of translating programs written in these various programming languages into the one or more IRs.

In some embodiments, one or more IRs created by the IR generator 204 may be graph-based, object-oriented structures. For example, one or more IRs may be in the form of a hierarchical Data Flow Graph (DFG) and/or a Parallel Intermediate Representation (PIR), which may include a plurality of IR objects, such as nodes, which may represent portions of the source program 300, interconnected by edges, which may represent data flow. In some embodiments, one or more IRs may be in the form of a Code Generation Intermediate Representation (CGIR). The CGIR may include nodes, which may represent blocks of program statements, and edges, which may represent control flow. In some embodiments, one or more IRs and/or one or more IR nodes may be implemented in other forms, such as a syntax tree, Abstract Syntax Tree (AST), Direct Acyclic Graph (DAG), Control Flow Graph (CFG), Control Data Flow Graph (CDFG), program structure tree (PST), etc. A CDFG may capture the control flow as well as the data flow of a source program through data dependency and control dependency edges. The one or more IRs created by the IR generator 204 may be stored in memory, such as a main memory or a persistent memory of a data processing device.

Suitable tools for translating a source program, such as the source program 300, into one or more IRs include the MATLAB Coder, the Simulink Coder, and the HDL Coder products from The MathWorks, Inc., and the tfcompile tool for ahead-of-time (AOT) compilation of TensorFlow programs. Nonetheless, other code generation systems and other compilers may be used.

The code generation system 200 may apply each of the DSLs selected at step 404 to the source program 300, e.g., by performing a number of steps, as indicated by block 414. Suppose, for example, that the selected DSLs are the Math Works auto-scheduler, a user-provided scheduler, Tiramisu, and Halide, as illustrated in FIG. 5. The code generation system 200 may start with a first of the selected DSLs, e.g., Halide. As described herein, following the evaluation of the first DSL, e.g., Halide, the code generation system 200 may proceed to evaluate any other selected DSLs, e.g., MathWorks auto-scheduler, a user-provided scheduler, and Tiramisu. The partitioning engine 214 may partition at least one IR generated for the source program 300 to include partitions that are compatible with the domain of the current DSL, e.g., Halide, as indicated at step 416. For example, the partitioning engine 214 may identify the portions, e.g., statements, of the IR generated for the source program 300 that are compatible with the DSL. IR portions or statements whose programming constructs conform to the domain of the DSL may be considered compatible with the DSL.

Depending on the particular DSL being applied, the partitioning engine 214 may be configured to search the IR for particular programming idioms and/or vectorized statements. Programming idioms are commonly used or accepted code patterns for implementing functionality in a given programming language. Vectorized statements refer to operations that are performed on multiple elements of an array, such as a vector, in one statement, e.g., at the same time. Examples of programming languages that support vectorized statements, e.g., operations operating on arrays, include the R and MATLAB languages and the NumPy library of the Python language. Examples of vectorized operations in the MATLAB language include addition (+), multiplication (*), type cast, which converts the data type of an input to a new data type without changing the underlying data, and intrinsic array functions. Exemplary intrinsic array functions include inquiry type functions, such as get the size of the array, get the shape of the array, etc., construction/manipulation type functions, such as trigonometric functions, square root functions, etc. and transformation/reduction type functions, such as sum. Examples of vectorized functions in the MATLAB language include permute, prod, reshape, sort, and sum, among others.

For the Halide DSL, which is used to create programs implementing image-processing pipelines and whose operations perform tensor operations, exemplary programming idioms include stencil, e.g., neighborhood, operations and reduction operations. Stencil operations compute each element of an output array as a function of a small region of an input array, and are often used to express filtering operations, such as convolution, median filtering, and finite element methods. Reduction operations reduce a set of elements, e.g., of an array, to a single element or to a smaller number of elements. The partitioning engine 214 may be configured to search the IR for stencil and reduction operations and for vectorized statements, when applying the Halide DSL.

The partitioning engine 214 may be configured to search the IR for operations involving sparse matrices as operations, e.g., matrix multiplication, when applying the TACODSL. When applying the TVM DSL, the partitioning engine 214 may be configured to search for layers of a deep learning network. When applying the Tiramisu DSL, the partitioning engine 214 may be configured to search for recurrent layers of a neural network, such as a Long Short Term Memory (LSTM) layer.

The data store 228 may contain a set of DSL search features 230 for each of the DSLs (or auto-schedulers) that may be applied to the source program 300 by the code generation system 200. Each set of DSL search features 230 may include programming constructs utilized by that DSL, such as particular programming idioms, vectorized statements, etc. The partitioning engine 214 may access the set of DSL search features for the particular DSL being applied.

Referring to the source program 300, the partitioning engine 214 may determine that only the component 308, which includes the three Neighborhood Processing subsystems 314-316, is compatible with the DSL currently applied, e.g., Halide. The partitioning engine 214 may determine that the code contained in the MATLAB function blocks 304 and 306 is not compatible with the DSL currently applied, e.g., Halide. In other cases, a model may include model elements performing vectorized operations such as matrix multiplication, Fast Fourier Transform (FFT), Finite Impulse Response (FIR), element-wise addition/product, and sum/product of elements, among others, and the partitioning engine 214 may determine that such operations are compatible with the DSL currently applied, e.g., Halide.

In addition to searching for and identifying portions, e.g., statements, in the IR that are compatible with the currently applied DSL, the partitioning engine 214 also may perform one or more additional steps, such as manipulating or modifying the statements, to put them in the form for the DSL being applied, as indicated at step 418. For example, for the Halide DSL, which is used to create image-processing pipelines, the partitioning engine 214 may stitch together statements found to be compatible with the Halide DSL into pipeline stages. The partitioning engine 214 may utilize one or more constructs defined by the Halide DSL to connect the statements into the pipeline stages.

Figure 4C:
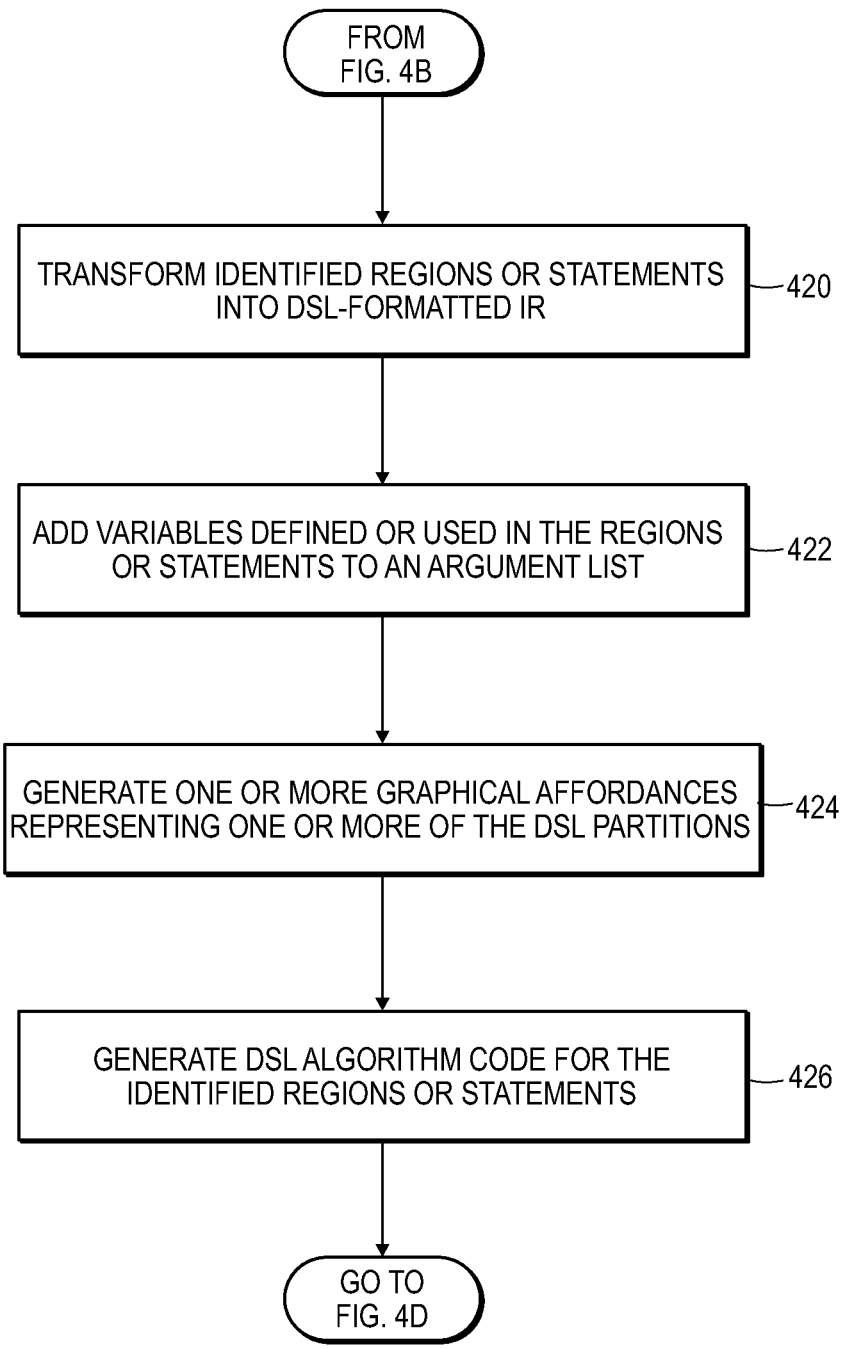
Figure 7:
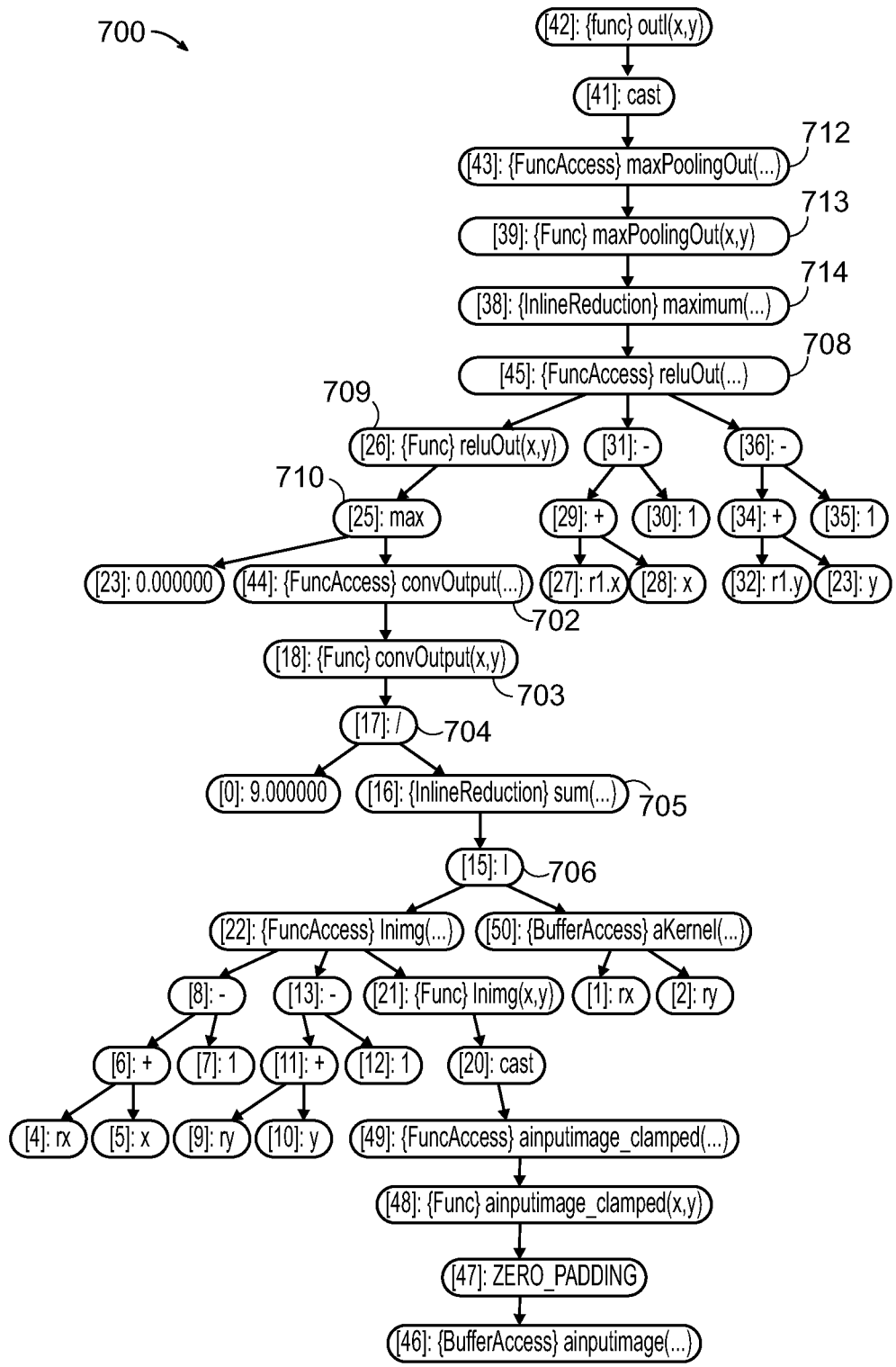
FIG. 7 is a schematic illustration of an example Intermediate Representation (IR) portion 700 complying with a currently applied DSL in accordance with one or more embodiments.

The IR translation engine 216 may transform the IR partitions or portions that have been identified as complying with the currently applied DSL, e.g., Halide, to an IR format of the DSL, as indicated at step 420 (FIG. 4C). FIG. 7 is a schematic illustration of an example Intermediate Representation (IR) portion 700 complying with a currently applied DSL in accordance with one or more embodiments. The IR 700 may be in the form of a Directed Acyclic Graph (DAG). The IR portion 700 may correspond to the portion of the source program 300 found to be compliant with the DSL, e.g., the component 308. Parts of the IR portion 700 may correspond to the Neighborhood Processing subsystems 314-316 configured to perform convolution, ReLU and max pooling. For example, nodes 702-706 implement convolution, nodes 708-710 implement ReLU, and nodes 712-714 implement max pooling.

The transformation of the portions or statements may include identifying variables defined or used in the portions or statements and translating the variable construct in the IR to an equivalent construct for the IR format of the currently applied DSL. The process may be implemented through one or more recursive calls. The IR translation engine 216 may also identify variables used or defined in as well as outside the portions or statements, and may add the variables to an argument list that may be maintained by the IR translation engine 216 and stored in memory, as indicated at step 422.

In some embodiments, the DSL graphic generator 218 may generate one or more graphical affordances for the DSL partitions, as indicated at step 424. For example, for the Halide DSL, the DSL graphic generator 218 may create an image of the image-processing pipeline constructed for the one or more partitions.

Figure 8:
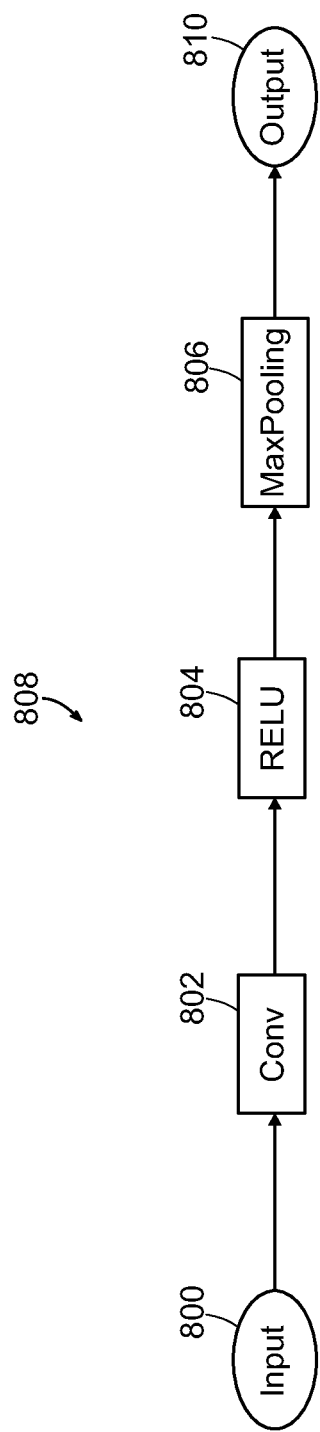
FIG. 8 is a schematic illustration of an example image for an image-processing pipeline in accordance with one or more embodiments.

FIG. 8 is a schematic illustration of an example image 800 for an image-processing pipeline in accordance with one or more embodiments. The image 800 may be generated by the UI engine 102 and presented on a display to provide a user with a high-level representation of at least some of the operations performed by the image-processing pipeline. In some embodiments, the image 800 may include icons representing the operations of the image processing pipeline. The image 800, for example, includes an icon 802 named 'Conv' representing a convolution operation, followed by an icon 804 named 'RELU' representing a ReLU operation, followed by an icon 806 named 'MaxPooling' representing a max pooling operation. The image 800 may also include icons 808 and 810 named 'Input' and 'Output' representing input and output of the pipeline. It should be understood that the image 800 is for purposes of explanation and that the UI engine 102 may generate other images to represent an image processing pipeline.

Figure 4D:
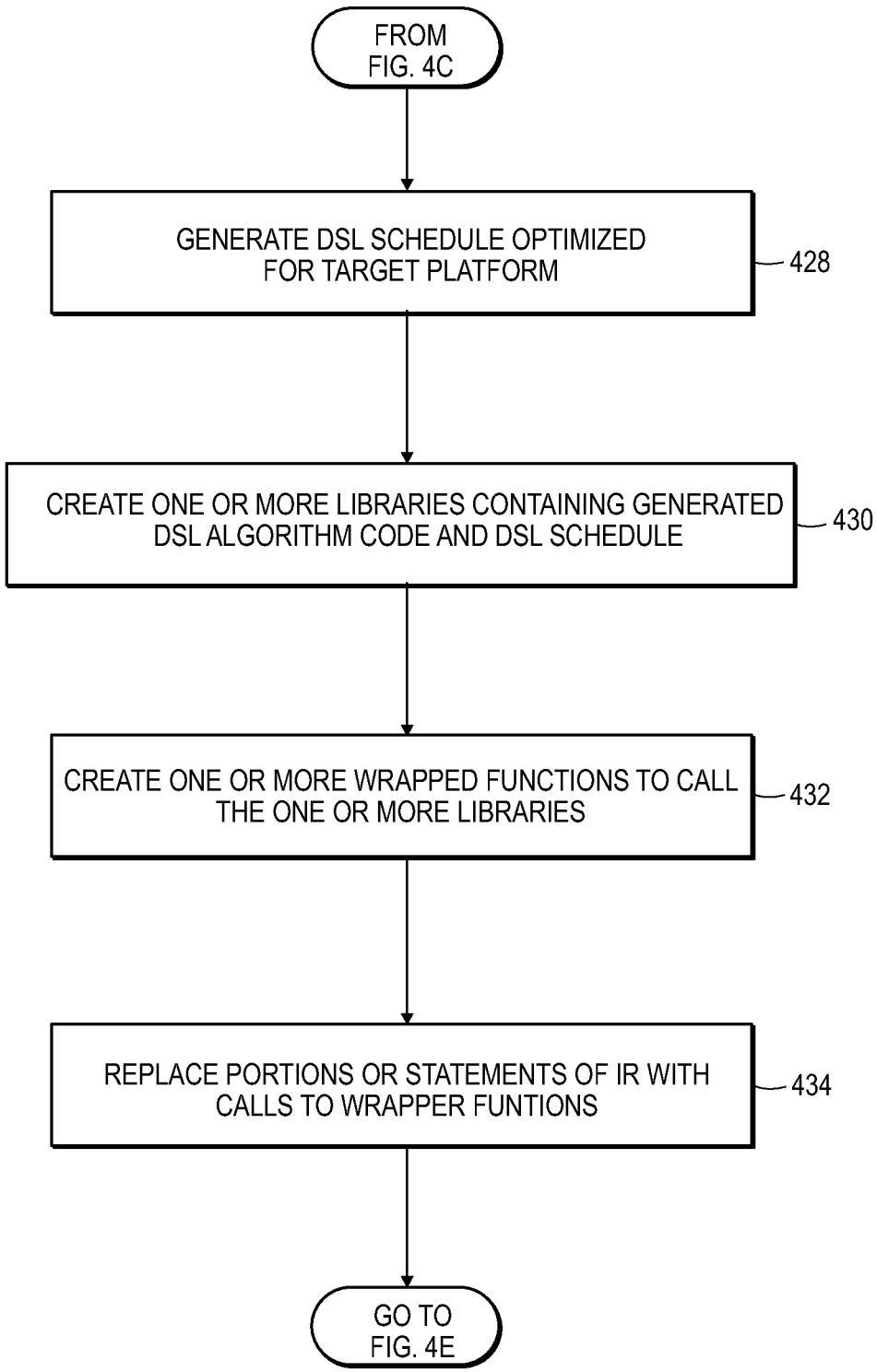

In some embodiments, the code generation system 200 may generate DSL algorithm code from the translated IR created for the partitions or statements, as indicated at step 426. For example, the back-end processing unit 206 may generate the DSL algorithm code, e.g., source code, from the IR 700, which may be a Directed Acyclic Graph (DAG). For the Halide DSL, the DSL algorithm code may be referred to as the Halide generator. If the generated code 128 for the source program 300 is C++ code, then the DSL algorithm code generated by the back-end processing unit 206 may be a file such as CnnHalideGenerator.cpp. The code generation system 200 also may direct the DSL compiler 114 to generate a schedule for the DSL algorithm code where the generated schedule is optimized for the target platform 136, as indicated at step 428 (FIG. 4D). For example, the code generation system 200 may issue one or more calls to the DSL compiler 114 that provide the DSL algorithm code, the target platform information 226, and the identity of the DSL autoscheduler if more than one is available for the DSL being applied, to the DSL compiler 114. In some embodiments, the code generation system 200 may include the DSL algorithm code, the target platform information 226, and the identity of the autoscheduler as arguments to the one or more calls to the DSL compiler 114. The target platform information 226 may include processor architecture information of the target platform 136. For a CPU target, the target platform information 226 may identify the processor as an x86 64-bit CPU architecture using Streaming SIMD Extension 4.1. For a GPU target, the target platform information may identify a processor as one of the family of Ampere or Volta architecture GPUs included in the Jetson series of System on Module (SOM) devices from NVIDIA Corp. of Santa Clara, CA. For the Halide DSL, the autoscheduler may be identified as the autoscheduler as described in A. Adams et al. *Learning to Optimize Halide with Tree Search and Random Programs* 2019 paper. The DSL compiler 114 may utilize the target platform information 226 and the identified autoscheduler (if one is provided) when generating a schedule for the DSL algorithm code. The DSL compiler 114 may generate an executable that includes a schedule optimized for the identified target hardware. The executable may be a file such as CnnHalideGenerator.exe.

The library builder 220 may automatically create the one or more libraries 232 that contain the generated DSL algorithm code and the schedule generated by the DSL compiler 114, as indicated at step 430. The library builder 220 also may create one or more wrapper functions for calling the one or more libraries, as indicated at step 432. The library builder may create the wrapper function to provide automatically generated type marshalling. Each wrapper function may specify one or more input arguments and one or more output arguments. The library creator 220 may utilize the variables included on the argument list, created at step 422, to specify the input and output arguments of the wrapper function. In some embodiments, the library creator 220 may configure the wrapper function to convert the raw input array into a Halide buffer class object, e.g., called halide_buffer_t, to call the Halide library function with this buffer class object, halide_buffer_t, as the function's inputs and outputs, to convert the output halide_buffer_t object into a raw output array, without deleting the raw input and output arrays. In some embodiments, the library creator 220 may include a pointer to the raw input array and further include information on the offset, stride, and size of each dimension of the array. Halide may utilize this information to work with the flat array as a multi-dimensional array.

The IR translation engine 216 may replace the portions or statements of the IR that were converted to the one or more libraries 232 with calls to the wrapper functions, as indicated at step 434. For example, the IR translation engine 216 may delete the portions or statements and insert the wrapper functions in their place.

Figure 9:
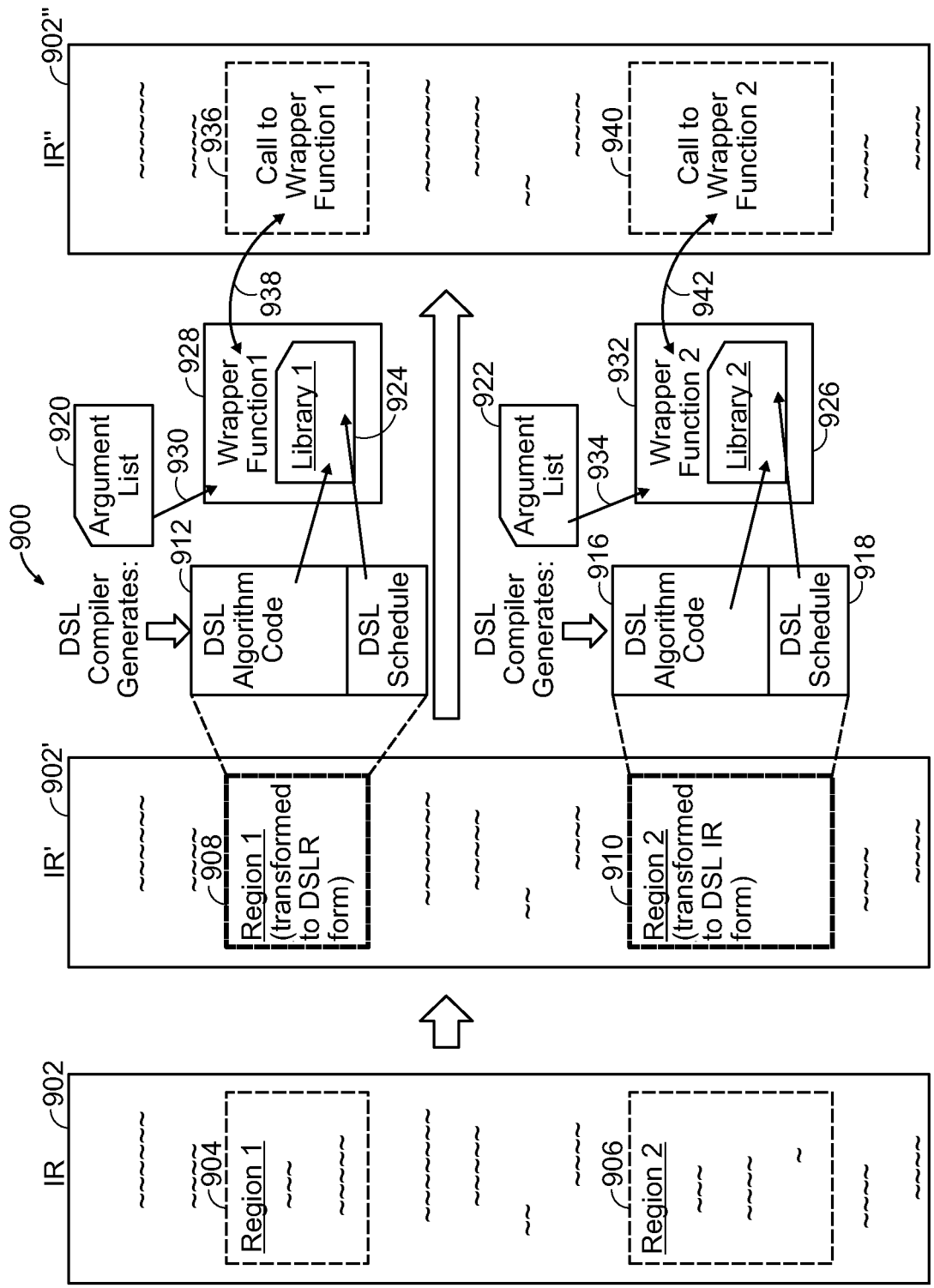
FIG. 9 is a schematic illustration of an example IR translation process in accordance with one or more embodiments.

FIG. 9 is a schematic illustration of an example IR translation process 900 in accordance with one or more embodiments. As described, an IR 902 may be generated for the source program 300. The source program 300 is in a programming language other than the one or more DSLs being applied to the source program 300. That is, the source program 300 may not include statements conforming to the syntax and semantics of the one or more DSLs. Instead, the statements of the source program conform to the syntax and semantics of another programming language, such as C, C++, MATLAB, Python, etc.

The partitioning engine 214 may identify one or more regions, such as regions 904 and 906 whose statements as included in the IR 902 are compatible with the DSL being applied. The IR translation engine 216 may create a revised IR 902' by transforming the regions 904 and 906 into IR forms of the DSL being applied as indicated in FIG. 9 at 908 and 910. For each of the transformed regions 908 and 910, the code generation system 200 may direct the DSL compiler 114 to generate DSL algorithm code and a schedule. For example, for the region 908, the DSL compiler 114 may generate DSL algorithm code 912 and a schedule 914. For the region 910, the DSL compiler 114 may generate DSL algorithm code 916 and a schedule 918. For each region 908 and 910, the IR translation engine 216 may generate an argument list as indicated in FIG. 9 at 920 and 922. The library builder 220 may create a library for the DSL algorithm code and the schedule generated for each region. For example, for the DSL algorithm code 912 and the schedule 914, the library builder 220 may create a library 924. For the DSL algorithm code 916 and the schedule 918, the library builder 220 may create a library 926.

In some embodiments, the library builder 220 may create wrapper functions for the libraries. For example, the library builder 220 may create a wrapper function 928 for the library 924. The library builder 220 may utilize the argument list 920 when creating the wrapper function 928 for the library 924 as illustrated by arrow 930. The library builder 220 may create a wrapper function 932 for the library 926. The library builder 220 may utilize the argument list 922 when creating the wrapper function 932 for the library 928 as illustrated by arrow 934. The IR translation engine 216 may create a further revised IR 902" by replacing the statements of the region 908 with a function call 936 to the wrapper function 928. The function call 936 may pass one or more input arguments to the wrapper function 928 and may receive one or more output arguments computed by the library 924 as illustrated by arrow 938. The IR translations engine 216 also may replace the statement of the region 910 with a function call 940 to the wrapper function 932. The function call 940 may pass one or more input arguments to the wrapper function 932 and may receive one or more output arguments computed by the library 926 as illustrated by arrow 942.

Figure 4E:
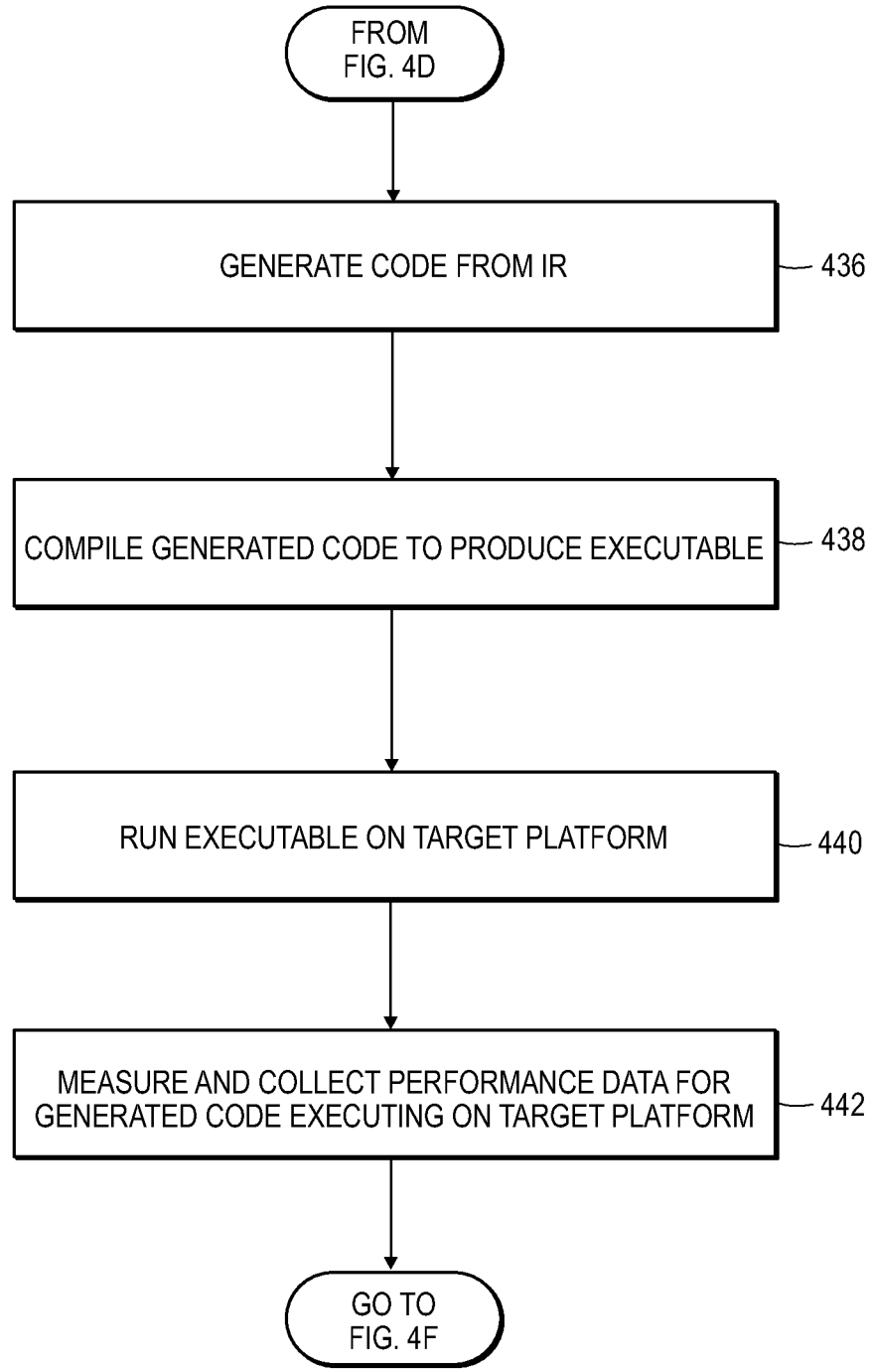

Turning to FIG. 4E, the back-end processing unit 206 may utilize the IR, e.g., the IR 902", which may be in a code generation form, to generate the generated code 128, as indicated at step 436. In some embodiments, the generated code 128 may be in source code format, and may include a main file, one or more make files, and one or more build scripts. The code generation system 200 may store the generated code 128 and other files in computer memory, for example in a project container.

In some embodiments, a compiler, such as the compiler 132, may compile the generated code 128 to produce the executable 134, as indicated at step 438. The executable 134 may be deployed and run, e.g., executed, on the target platform 136, as indicated at step 440. In some embodiments, the program development environment 100 may run the executable 134 in a Model-in-the-loop (MIL), Software-in-the-loop (SIL), Processor-in-the-loop (PIL), or Hardware-in-the-loop (HIL) environment. The code profiler 112 may measure and collect performance data, such as execution time, during execution of the executable 134 on the target platform 136, as indicated at step 442.

Figure 4F:
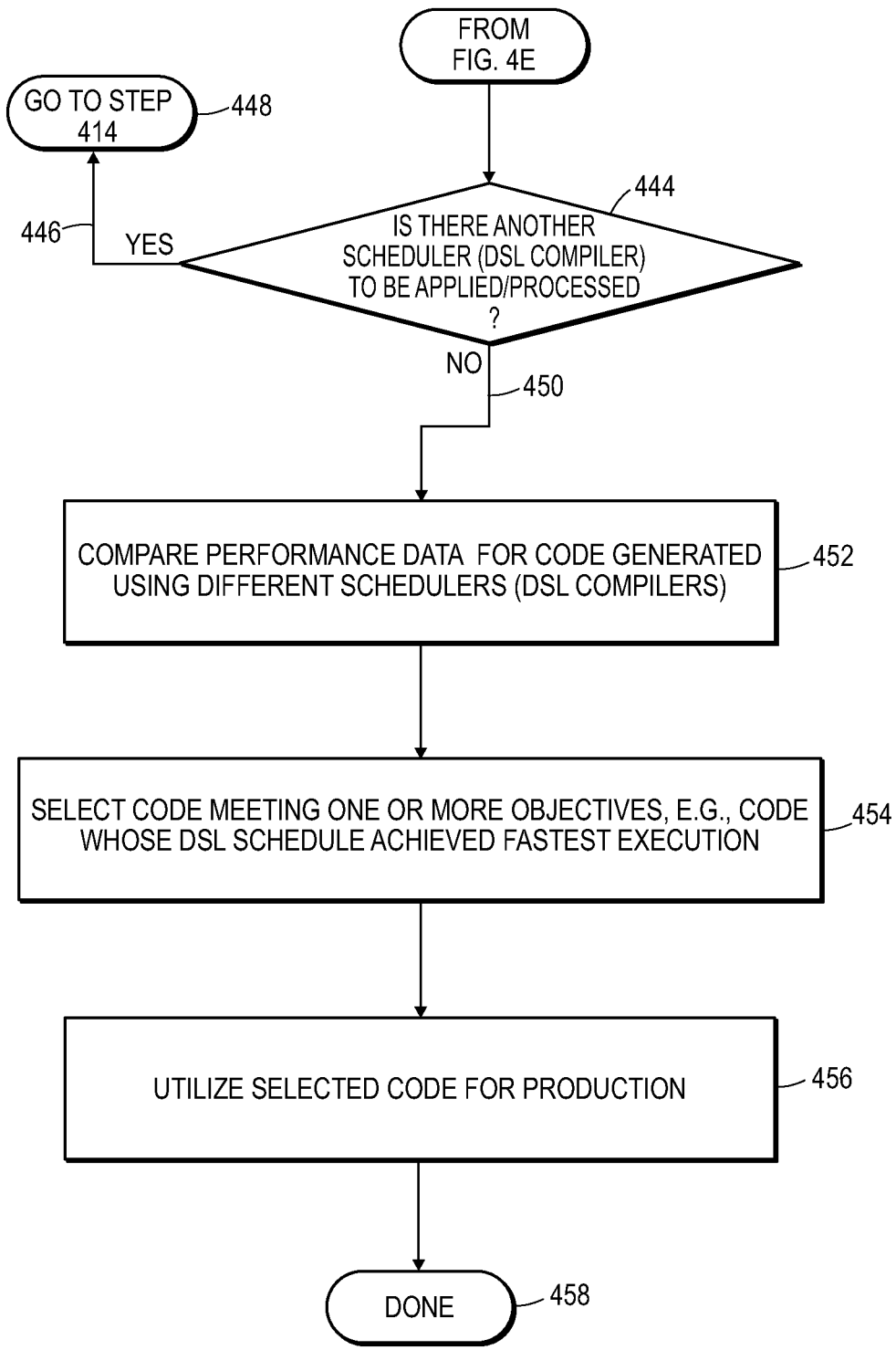

The selector 212 may determine whether another DSL was included in the set of DSLs to be evaluated, e.g., applied to the source program 300, as indicated at decision step 444 (FIG. 4F). If so, processing may return to step 414, as indicated by Yes arrow 446 leading to GoTo step 448. Steps 414 to 442 may then be repeated for the next DSL to be evaluated. For example, as indicated at FIG. 5, the code generation system may proceed to evaluate the Math Works auto-scheduler, the user-provided scheduler, and Tiramisu.

FIG. 10 is a highly schematic illustration of example DSL algorithm code 1002 and an example schedule 1004 created by a DSL, e.g., Halide, applied to the component 308 of the source program 300 in accordance with one or more embodiments. The Halide DSL algorithm code 1002 may include one or more Func objects, such as Func object 1006. Func objects define the computations performed by the pipeline stages of the image-processing pipeline created by the DSL, e.g., Halide. For example, a Func object may be a pure function defining the value for each output element, e.g., pixel, of the pipeline stage. The Func object 1006 defines a pipeline stage function named 'temp1'. The 'temp1' object 1006 includes a statement 1008 for computing an array named 'Out1'. The Halide DSL algorithm code 1002 also includes two Var objects 1010 and 1012 named 'd1' and 'd2' that are variables included in the Func object 1006.

The Halide schedule 1004 for the algorithm code 1002 utilizes scheduling primitives to specify an execution schedule for each of the pipeline stages as defined through the Func objects. For example, the Halide schedule 1004 includes a schedule 1014 for the 'temp1' pipeline stage and a schedule 1016 for the 'Out1' array. The Halide schedule 1014 includes split, vectorize, compute_at, and reorder scheduling primitives and the schedule 1016 includes split, vectorize, reorder, and parallel scheduling primitives.

FIG. 11 is a highly schematic illustration of example DSL algorithm code 1102 and an example schedule 1104 created by another DSL, e.g., Tiramisu, applied to the component 308 of the source program 300 in accordance with one or more embodiments. The Tiramisu DSL algorithm code 1102 includes operations for computing a variable named 'temp1' as indicated at 1106 and operations for computing a variable named 'output' as indicated at 1108.

The Tiramisu schedule 1104 for the algorithm code 1102 utilizes scheduling primitives to set forth an execution schedule 1110 for the operations for computing the 'temp1' variable and an execution schedule 1112 for the computing the 'output' variable. As shown by comparing the schedules 1110 and 1014 for 'temp1', the two DSLs, Halide and Tiramisu, produce different execution schedules. The two DSLs also produce different schedules 1112 and 1016 for 'output' and 'Out1'.

Returning to FIG. 4F, once all selected DSLs have been evaluated, as indicated by No arrow 450 leading to block 452, the program development environment 100 may compare the performance data associated with the schedules produced by the different DSLs, e.g., execution times, as indicated by step 452. In some embodiment, the UI engine 102 may generate a report with the performance information associated with the different DSLs.

FIG. 12 is an illustration of an example report 1200 on the performance of evaluated DSLs in accordance with one or more embodiments. The report 1200 may be organized as a spreadsheet or a table having a plurality or rows and columns defining cells or records for storing and/or presenting information. For example, the report 1200 may include a plurality of rows 1202*a-d* and each row 1202 may correspond to one of the schedulers applied to the source program 300. The report 1200 may also include a column 1204 that indicates the name of the respective scheduler. As indicated, row 1202*a* may correspond to a built-in scheduler of the program development environment 100 named 'MathWorks auto-scheduler'. Row 1202*b* may correspond to a scheduler provided to the code generation system 200 by the user named 'User provided'. Row 1202*c* may correspond to the Halide DSL scheduler. Row 1202*d* may correspond to the Tiramisu DSL scheduler. It should be understood that the schedulers listed in rows 1202 are for illustrative purposes and that the present disclosure may be used with other schedulers and their results may be presented in the report 1200.

The report 1200 also includes a plurality of columns that provide results for execution performance metrics determined by the code profiler 112 during the running of the generated code using the execution schedules generated by the evaluated schedulers of rows 120*a-d*. For example, column 1206 presents the average (Avg) runtime of the code in milliseconds (ms), column 1208 presents the maximum (Max) runtime, column 1210 presents the average memory space utilized by the generated code during execution in megabytes (MB), column 1212 presents the maximum memory space utilized by the generated code during execution, and column 1214 presents the average number of level one (L1) cache misses during execution of the generated code. In some embodiments, the generated code with each evaluated scheduler may be run multiple times, and the results used to compute the presented averages and maximums.

It should be understood that the code profiler 112 and/or the report generator 210 may be configured to determine and present additional and/or other execution performance metrics in the report 1200. For example, the code profiler 112 and the report generator 210 may determine and present minimum runtime execution speed, minimum dynamic memory utilization, core usage of a multi-core CPU, cache level utilization, overall throughput, and power consumption of the target hardware, among others. The code profiler 112 may also differentiate between stack and heap memory, which may be presented in the report 1200 by the report generator 210.

Returning to FIG. 4F, in some embodiments, the version of the generated code that meets one or more objectives, such as fastest execution time, may be selected, as indicated at step 454. In some embodiments, the selection may be made automatically by the selector 212. For example, the selector 212 may be configured with one or more goals or objectives, such as shortest maximum execution time, shortest average execution time, etc. The selector 212 may select the particular generated code meeting the predefined goal or objective. In some embodiments, the user may specify and/or modify the predefined goal or objective to be applied by the selector 212. The goal or objective may be used to automatically select a scheduler. In other embodiments, the user may manually select a desired version of the generated code. The selected code may be utilized in production of the system being designed, as indicated at step 456. Processing may then be complete as indicated by Done block 458.

In some embodiments, the code generation system 200 may include or have access to multiple back-end processing units. For example, one back-end unit may be configured to produce C/C++ code from the IR generated for the source program 300. Another back-end processing unit may be configured to produce CUDA/OpenCL code. Another back-end processing unit may be configured to generate Mojo code. Another back-end processing unit may be configured to generate LLVM assembly code. Another back-end processing unit may be configured to generate Hardware Description Language (HDL) code, such as VHDL or Verilog code.

In some embodiments, the code generation system 200 may be configured to utilize a schedule generated by one or more of the DSL compilers 114 directly into the code generated for the source program 300. That is, code generation system 200 may avoid generating and utilizing DSL algorithm code and instead utilize only an execution schedule generated by one or more of the DSL compilers 114 in the generated code 128 for the source program 300.

Figure 13:
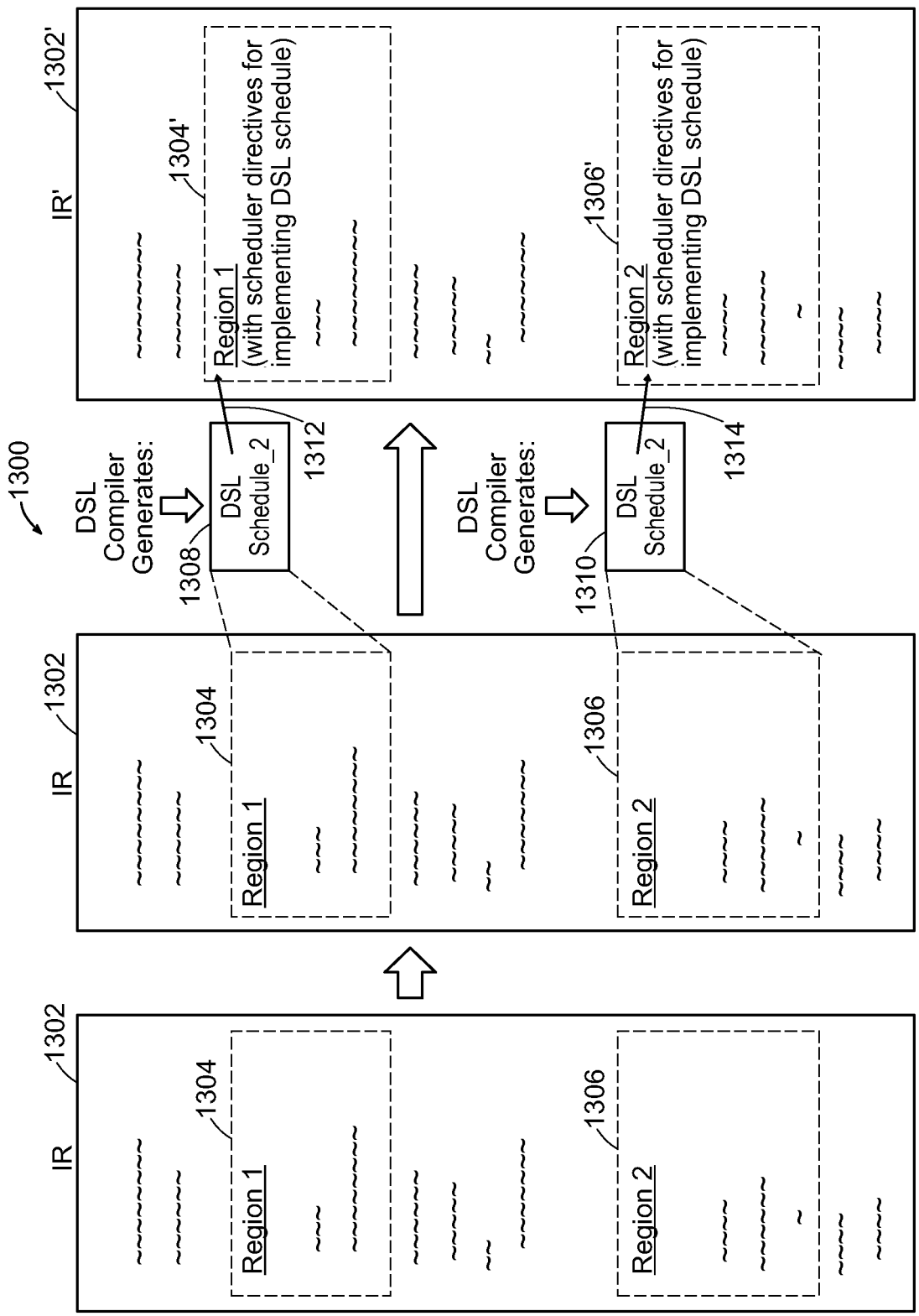
FIG. 13 is a schematic illustration of another example IR translation process in accordance with one or more embodiments.

FIG. 13 is a schematic illustration of an example IR translation process 1300 in accordance with one or more embodiments. As described, an IR 1302 may be generated for the source program 300, which is in a programming language other than the one or more DSLs being applied to the source program 300. The partitioning engine 214 may identify one or more regions, such as regions 1304 and 1306 whose statements as included in the IR 1302 are compatible with the DSL being applied. For example, region 1304 may include a matrix multiplication operation and region 1306 may include an erode operation. For each region 1304 and 1306, the code generation system 200 may direct one or more of the DSL compilers 114 to generate a schedule. For example, for the region 1304, the one or more DSL compilers 114 may generate a DSL schedule 1308. For the region 1306, the DSL compiler 114 may generate a DSL schedule 1310. As the code regions 1304 and 1306 are different, the two DSL schedules 1308 and 1310 will typically be different from each other. In some embodiments, the two DSL schedules 1308 and 1310 may even be generated by different auto-schedulers of the DSL being applied. As indicated in the embodiment of FIG. 13, while DSL schedules 1308 and 1310 are generated for the compatible regions 1304 and 1306, DSL algorithmic code is not generated for the regions 1304 and 1306.

One or more components of the code generation system 200, such as the back-end processing unit 206, may generate an execution for the source program 300, e.g., as represented by the IR 1302. The schedule integration engine 222 may analyze the DSL schedule 1308 generated for the region 1304 by the DSL compiler 114 and may provide the DSL schedule 1308 to the back-end processing unit 206 so that the DSL schedule 1308 can be incorporated into the schedule generated by the back-end processing unit 206 for the source program 300. In some embodiments, the schedule integration engine 222 may translate one or more scheduling directives included in the DSL schedule 1308 into ones matching the scheduling directives supported and/or utilized by the back-end processing 206. For example, the back-end processing unit 206 may not recognize and/or implement one or more scheduling directives included in the DSL schedule 1308 by the DSL compiler 114. The schedule integration engine 222 may be configured with a mapping unit that maps unrecognized/unimplemented scheduling directives contained in the DSL schedule 1308 into scheduling directives that are recognized/implemented by the back-end unit 206. For example, a 'tile' primitive may be converted to several 'split' primitives and a 'reorder' primitive. The back-end processing unit 206 may create a revised IR 1302' from the IR 1302 where the revised IR 1302' incorporates the DSL schedule 1308 determined by the DSL compiler 114 into the source program 300, including any translation of scheduler directives as needed, as indicated by arrow 1312 leading to revised region 1304'.

The schedule integration engine 222 also may translate one or more scheduling directives included in the DSL schedule 1310 generated for the region 1306 that are not recognized/implemented by the back-end processing unit 206 into scheduling directives that are recognized/implemented by the back-end processing unit 206. The back-end processing unit 206 also may incorporate the DSL schedule 1310 determined by the DSL compiler 114 into the source program 300, including any translation of scheduler directives as needed, as indicated by arrow 1314 leading to revised region 1306'.

FIG. 14 is a schematic illustration of an example of generated code 1400 incorporating a DSL schedule in accordance with one or more embodiments. The generated code 1400 may include a code block 1402 that may correspond to the revised region 1304' including the DSL generated execution schedule 1308. As noted, the region 1304 for which revised region 1304' was generated may include a matrix multiplication operation. The code block 1402 may include parallelization scheduling for an outer for loop indicated at line 1404 and Single Instruction Multiple Data (SIMD) scheduling for an inner for loop indicated at line 1406. The generated code 1400 also may include a code block 1408 that may correspond to the revised region 1306' including the DSL generated execution schedule 1310. The code block 1408 may include 10×10 tiling scheduling for an outer for loop as indicated at lines 1410 and 1412 and SIMD scheduling for an inner for loop as indicated at line 1414.

In some embodiments, instead of creating libraries and a schedule, creating a wrapper function, and replacing statements, as indicated at steps 430-434 (FIG. 4D), the schedule integration engine 222 may integrate the schedule generated by the scheduler, e.g., at step 428, directly into an IR for the source program. The back-end processing unit 206 may then generate code from the IR that includes the schedule, e.g., as indicated at step 436, and/or it may generate a human readable version of the schedule, for example by annotating the source program with the generated schedule. The schedule and/or the annotated source program may be presented, e.g., displayed, to a user. The user may review the proposed schedule and may accept or revise the proposed schedule. Once accepted, code may be generated for the IR for the source program that includes the schedule, e.g., at step 436, and processing may continue as described.

FIG. 15 is a highly schematic illustration of an example of pseudocode 1500 for a program implementing an image processing pipeline according to one or more embodiments. The pseudocode 1500 may create a handle called 'pipeline' as indicated at entry 1502 to a convolution stage, a ReLU stage, and max pooling stage as indicated at entries 1504-1506, respectively. The pseudocode 1500 may thus represent a textual version of the component 308 (FIG. 3). The pseudocode 1500 may be written in a first language, such as MATLAB, Mojo, Julia, etc.

A scheduler, such as an autoscheduler of a DSL compiler, may be selected to generate a schedule for the pseudocode as described herein. The schedule may be integrated into an IR for the pseudocode 1500 and the back-end processing unit 206 may present a human-readable version of the schedule, which may be presented, e.g., displayed, to a user.

FIG. 16 is a highly schematic illustration of an example of human readable version of pseudocode 1600 including a schedule generated for the pseudocode 1500 by a selected scheduler in accordance with one or more embodiments. As indicated at entry 1602, the schedule may be generated for the pseudocode 1500 by running a function called 'coder.loop.Control' on the pipeline pseudocode 1500. The pseudocode 1600 may include a block 1604 containing the execution schedule determined for the max pooling stage 1506. As illustrated, the block 1604 includes scheduling primitives, such as 'tile', 'vectorize', 'reorder', and 'parallelize', that schedule vectorized statements of the max pooling stage 1506. The pseudocode 1600 may include a block 1606 containing the schedule determined for the ReLU stage 1505. The block 1606 includes 'tile', 'vectorize', 'compute_at', and 'reorder' scheduling primitives for the vectorized statements of the ReLU stage 1505. The pseudocode 1600 may include a block 1608 containing the schedule determined for the convolution stage 1504. The block 1608 includes 'tile', 'vectorize', 'compute_at', and 'reorder' scheduling primitives for the vectorized statements of the convolution stage 1504. The convolution stage 1504 may also include an update stage and the pseudocode 1600 may include a block 1610 containing the execution schedule determined for the update stage. The block 1610 includes 'tile', 'vectorize', and 'reorder' scheduling primitives. The pseudocode 1600 may include an entry 1612 containing a command or function, for example called 'apply', that may apply the determined schedule to the pseudocode 1500.

In some embodiments, the schedule as presented at blocks 1604, 1606, 1608, and 1610 may be editable. For example, a user may revise the schedule by changing the order of the scheduling primitives, replacing existing primitives with different primitives, modifying argument values of existing primitives, adding new primitives, or removing existing primitives. For example, a user may change tile sizes for tile scheduling primitives or the vectorization size for vectorize primitives.

Figure 17:
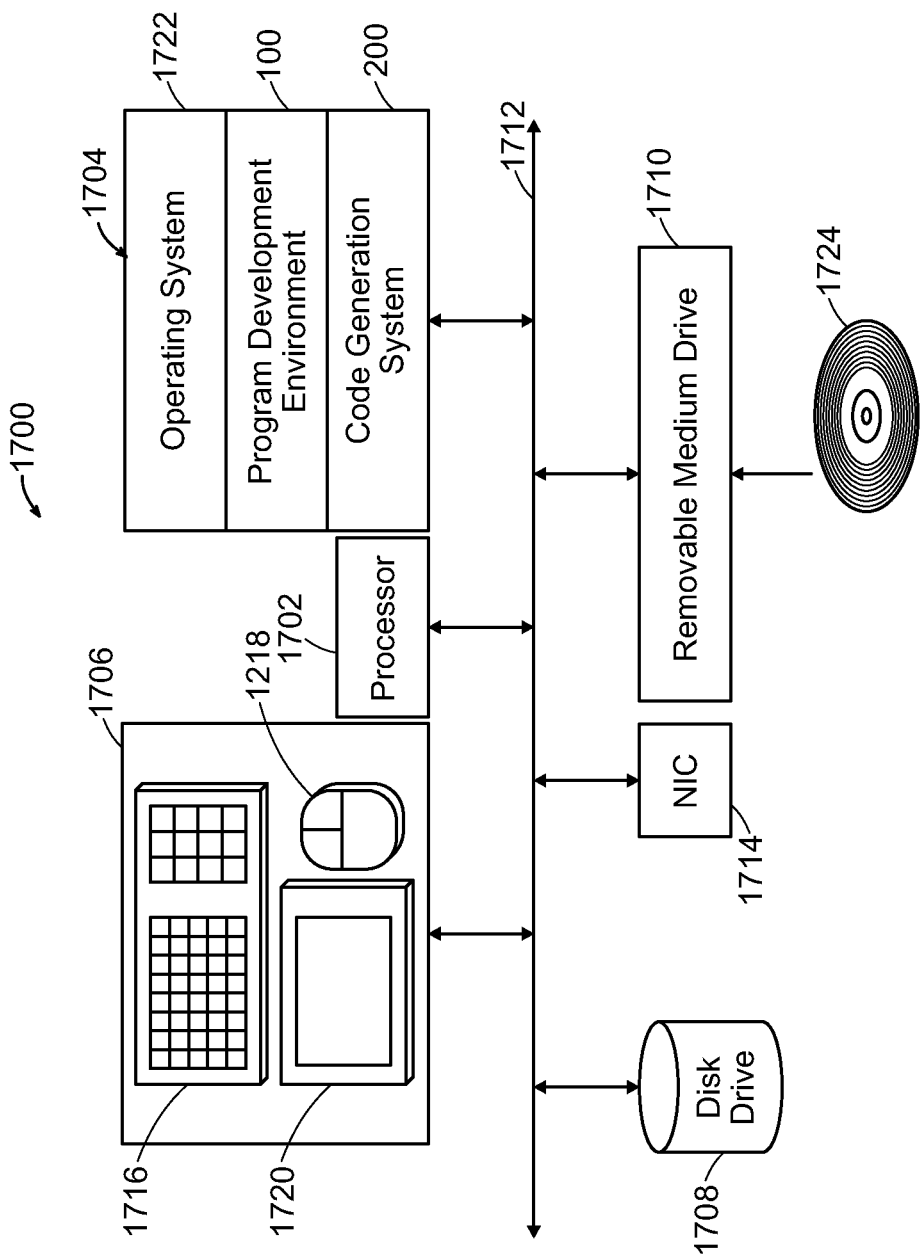
FIG. 17 is a schematic illustration of an example computer or data processing system in accordance with one or more embodiments.

FIG. 17 is a schematic illustration of an example computer or data processing system 1700 for implementing one or more embodiments of the disclosure in accordance with one or more embodiments. The computer system 1700 may include one or more processing elements, such as a processor 1702, a main memory 1704, user input/output (I/O) 1706, a persistent data storage unit, such as a disk drive 1708, and a removable medium drive 1710 that are interconnected by a system bus 1712. The computer system 1700 may also include a communication unit, such as a network interface card (NIC) 1714. The user I/O 1706 may include a keyboard 1716, a pointing device, such as a mouse 1718, and a display 1720. Other user I/O 1706 components include microphones, speakers, voice or speech command systems, touchpads and touchscreens, wands, styluses, printers, projectors, etc. Exemplary processors include single or multicore Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1704, which may be a Random Access Memory (RAM), may store a plurality of program libraries or modules, such as an operating system 1722, and one or more application programs that interface to the operating system 1722, such as the program development environment 100 and/or the code generation system 200.

The removable medium drive 1710 may accept and read a computer readable medium 1724, such as a CD, DVD, floppy disk, solid state drive, tape, flash memory or other non-transitory medium. The removable medium drive 1710 may also write to the computer readable medium 1724.

Suitable computer systems include personal computers (PCs), workstations, servers, laptops, tablets, palm computers, smart phones, electronic readers, and other portable computing devices, etc. Nonetheless, those skilled in the art will understand that the computer system 1700 of FIG. 17 is intended for illustrative purposes only, and that the present disclosure may be used with other computer, data processing, or computational systems or devices. The present disclosure may also be used in a computer network, e.g., client-server, architecture, or a public and/or private cloud computing arrangement. For example, the code generation system 200 may be hosted on one or more cloud servers or devices, and accessed by remote clients through a web portal or an application hosting system.

Suitable operating systems 1722 include the Windows series of operating systems from Microsoft Corp. of Redmond, WA, the Android and Chrome OS operating systems from Google Inc. of Mountain View, CA, the Linux operating system, the MAC OS® series of operating systems from Apple Inc. of Cupertino, CA, and the UNIX® series of operating systems, among others. The operating system 1722 may provide services or functions for applications or modules, such as allocating memory, organizing data objects or files according to a file system, prioritizing requests, managing I/O, etc. The operating system 1722 may run on a virtual machine, which may be provided by the data processing system 1700.

As indicated above, a user, such as an engineer, scientist, programmer, developer, etc., may utilize one or more input devices, such as the keyboard 1716, the mouse 1718, and the display 1720 to operate the program development environment 100 and/or the code generation system 200.

Figure 18:
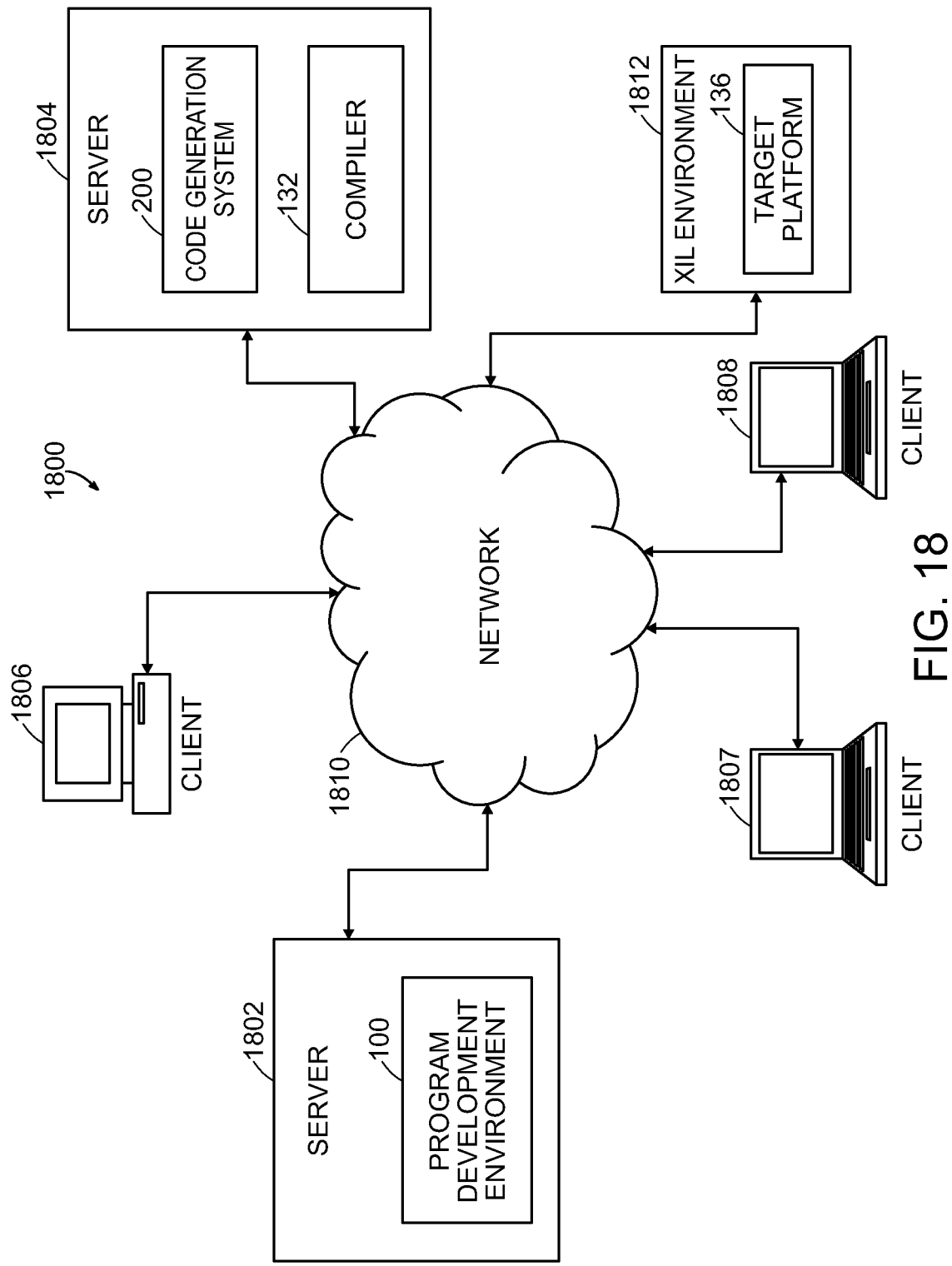
FIG. 18 is a schematic diagram of an example distributed computing environment in accordance with one or more embodiments.

FIG. 18 is a schematic diagram of an example distributed computing environment 1800 in which systems and/or methods described herein may be implemented in accordance with one or more embodiments. The environment 1800 may include client and server devices, such as two servers 1802 and 1804, and three clients 1806-1808, interconnected by one or more networks, such as network 1810. The servers 1802 and 1804 may include applications or processes accessible by the clients 1806-1808. For example, the server 1802 may run the program development environment 100. The server 1804 may run the code generation system 200 and the compiler 132. The devices of the environment 1800 may interconnect via wired connections, wireless connections, or a combination of wired and wireless connections.

In some embodiments, the source program may be 300 a simulation model implemented as a time-based block diagram. A time-based block diagram may include, for example, model elements, such as blocks, connected by lines, e.g., arrows, that may represent signal values written and/or read by the model elements. A signal is a time varying quantity that may have a value at all points in time during execution of a model, for example at each simulation or time step of the model's iterative execution. A signal may have a number of attributes, such as signal name, data type, numeric type, dimensionality, complexity, sample mode, e.g., sample-based or frame-based, and sample time. The model elements may themselves consist of elemental dynamic systems, such as a differential equation system, e.g., to specify continuous-time behavior, a difference equation system, e.g., to specify discrete-time behavior, an algebraic equation system, e.g., to specify constraints, a state transition system, e.g., to specify finite state machine behavior, an event based system, e.g., to specify discrete event behavior, etc. The connections may specify input/output relations, execution dependencies, variables, e.g., to specify information shared between model elements, physical connections, e.g., to specify electrical wires, pipes with volume flow, rigid mechanical connections, etc., algorithms, e.g., to be applied to an input, an output, a value, etc., or the like.

In a time-based block diagram, ports may be associated with model elements. A relationship between two ports may be depicted as a line, e.g., a connector line, between the two ports. Lines may also, or alternatively, be connected to other lines, for example by creating branch points. A port may be defined by its function, such as an input port, an output port, an enable port, a trigger port, a function-call port, a publish port, a subscribe port, an exception port, an error port, a physics port, an entity flow port, a data flow port, a control flow port, etc.

Relationships between model elements may be causal and/or non-causal. For example, a model may include a continuous-time integration block that may be causally related to a data logging block by depicting a connector line to connect an output port of the continuous-time integration block to an input port of the data logging model element. Further, during execution of the model, the value stored by the continuous-time integrator may change as the current time of the execution progresses. The value of the state of the continuous-time integrator block may be available on the output port and the connection with the input port of the data logging model element may make this value available to the data logging block.

In some implementations, a model element may include or otherwise correspond to a non-causal modeling function or operation. An example of a non-causal modeling function may include a function, operation, or equation that may be executed in different fashions depending on one or more inputs, circumstances, and/or conditions. A non-causal modeling function or operation may include a function, operation, or equation that does not have a predetermined causality.

In some embodiments, the program development environment 100 may implement a graphical programming language having a syntax and semantics, and simulation models may be constructed according to the syntax and semantics defined by the program development environment 100.

In some embodiments, the distributed environment 1800 may include one or more of a Model-in-the-loop (MIL), Software-in-the-loop (SIL), Processor-in-the-loop (PIL), or Hardware-in-the-loop (HIL) environment indicated at 1812 as an XIL environment. The XIL environment 1812 may include or have access to the target platform 136.

The servers 1802 and 1804 may include one or more devices capable of receiving, generating, storing, processing, executing, and/or providing information. For example, the servers 1802 and 1804 may include a computing device, such as a server, a desktop computer, a laptop computer, a tablet computer, a handheld computer, or a similar device.

The clients 1806-1808 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1806-1808 may download data and/or code from the servers 1802 and 1804 via the network 1810. In some implementations, the clients 1806-1808 may be desktop computers, workstations, laptop computers, tablet computers, handheld computers, mobile phones (e.g., smart phones, radiotelephones, etc.), electronic readers, or similar devices. In some implementations, the clients 1806-1808 may receive information from and/or transmit information to the servers 1802 and 1804.

The network 1810 may include one or more wired and/or wireless networks. For example, the network 1810 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The number of devices and/or networks shown in FIG. 18 is provided as an example. In practice, there may be additional devices and/or networks, fewer devices and/or networks, different devices and/or networks, or differently arranged devices and/or networks than those shown in FIG. 18. Furthermore, two or more devices shown in FIG. 18 may be implemented within a single device, or a single device shown in FIG. 18 may be implemented as multiple, distributed devices. Additionally, one or more of the devices of the distributed computing environment 1800 may perform one or more functions described as being performed by another one or more devices of the environment 1800.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system, such as a computer running a chatbot or generative Artificial Intelligence (AI) system, or a human user of a computer or data processing system, unless otherwise stated.

In some embodiments, a user may interact with one or more of the program development environment 100 or the code generation system 200 using spoken commands that may be input to the data processing system 1700 through a microphone or by using eye, hand, facial, or other body gestures that may be input to the data processing system 1700 through a camera. In addition, auditory outputs may be generated by one or more of the program development environment 100 or the code generation system 200 additionally or alternatively to graphically and textually presented outputs, and the auditory outputs may be presented to the user through a speaker.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, the compiler 132 and the code generation system 200 may be combined into a single entity. Therefore, it is the object of the appended claims to cover all such variations and modifications as come within the true spirit and scope of the disclosure.

What is claimed is:

1. A computer-implemented method comprising:
accessing a computer program written in a first programming language, the computer program including tensor-based operations that are implemented as programming idioms or vectorized statements of the first programming language;
receiving information on resources of a target hardware system;
receiving an identification of a scheduler of a second programming language different from the first programming language;
generating, by one or more processors, a first Intermediate Representation (IR) of the computer program;
partitioning the first IR of the computer program into a plurality of partitions wherein the plurality of partitions include the tensor-based operations, the partitioning including searching the first IR for the programming idioms or the vectorized statements;
generating, by the one or more processors, an IR for the plurality of partitions, the Intermediate Representation for the plurality of partitions compatible with the second programming language;
generating, by the scheduler of the second programming language, a schedule for the plurality of partitions, wherein the generating the schedule includes analyzing the IR for the plurality of partitions, further wherein the scheduler considers the information on the resources of the target hardware system;
generating, by the one or more processors, a second IR for the computer program, wherein the second IR for the computer program includes the schedule for the plurality of partitions as generated by the scheduler of the second programming language; and
generating code based on the second IR for the computer program, wherein the code implements the schedule for the plurality of partitions as generated by the scheduler of the second programming language.

2. The computer-implemented method of claim 1 further comprising:
receiving identification of a scheduler of a third programming language; and
repeating
the generating the IR for the plurality of partitions,
the analyzing,
the generating the second IR for the computer program, and
the generating code,
with the scheduler of the third programming language.

3. The computer-implemented method of claim 1 wherein the first programming language is a functional language or an imperative language, the second programming language is a Domain Specific Language (DSL), and the DSL is Halide, Tiramisu, Tensor Algebra Compiler (TACO), Seq, Tensor Comprehensions (TC), Fireiron, or TVM.

4. The computer-implemented method of claim 1 wherein the first programming language is graphical programming language, Modelica, Octave, Julia, or Python.

5. The computer-implemented method of claim 1 wherein the second IR for the computer program is a tensor directed acyclic graph (DAG).

6. The computer-implemented method of claim 1 wherein the resources of the target hardware system include one or more of:
number of cores;
vectorization option;
instruction set extensions;
application-specific instruction set (ASIP);
single instruction multiple data (SIMD) register size;
memory hierarchy;
cache attributes; or
graphics processor unit (GPU).

7. The computer-implemented method of claim 6 wherein the scheduler considers the information on the resources of the target hardware system to improve execution performance of the plurality of partitions at the target hardware system.

8. The computer-implemented method of claim 1 wherein the tensor-based operations include one or more of:
neighborhood operations;
stencil operations;
element-wise mathematical operations;
convolution operations;
batch normalization operations;
operations applying a specified function to each element of an array operations applying a given function to each page of an array; or
matrix multiplication operations.

9. The computer-implemented method of claim 1 wherein the code generated from the second IR for the computer program is:
C code;
C++ code;
CUDA code;
OpenCL code,
Mojo code,
LLVM assembly code, or
MLIR code.

10. The computer-implemented method of claim 1 wherein the second programming language supports separating an algorithm from an execution schedule for the algorithm.

11. The computer-implemented method of claim 1 further comprising:
annotating, by the one or more processors, the computer program with scheduler directives or configuration settings that represent the schedule for the tensor-based operations as determined by the scheduler.

12. The computer-implemented method of claim 1 further comprising:
running the code on the target hardware system; and
evaluating the code as run on the target hardware system.

* * * * *